(12) United States Patent
Ide

(10) Patent No.: US 12,204,110 B2
(45) Date of Patent: Jan. 21, 2025

(54) DISPLAY DEVICE AND COMPOSITE DISPLAY DEVICE

(71) Applicant: SEIKO EPSON CORPORATION, Tokyo (JP)

(72) Inventor: Mitsutaka Ide, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 19 days.

(21) Appl. No.: 18/192,185

(22) Filed: Mar. 29, 2023

(65) Prior Publication Data
US 2023/0314812 A1   Oct. 5, 2023

(30) Foreign Application Priority Data
Mar. 30, 2022  (JP) .................................. 2022-055323

(51) Int. Cl.
*G02B 27/01*   (2006.01)
*G02B 5/30*   (2006.01)

(52) U.S. Cl.
CPC ....... *G02B 27/0172* (2013.01); *G02B 5/3025* (2013.01); *G02B 2027/0178* (2013.01)

(58) Field of Classification Search
CPC .............. G02B 27/0172; G02B 5/3025; G02B 2027/0178; G02B 27/283; G02B 2027/0114
See application file for complete search history.

(56) References Cited

U.S. PATENT DOCUMENTS

| | | | | |
|---|---|---|---|---|
| 3,658,405 A * | 4/1972 | Pluta | ...................... | G02B 21/14 359/489.08 |
| 3,677,621 A * | 7/1972 | Smith | .................. | G02B 27/283 359/371 |
| 5,624,174 A * | 4/1997 | Loucks | ................ | H04N 9/3105 353/122 |
| 5,715,084 A * | 2/1998 | Takahashi | .............. | G02B 17/08 355/60 |
| 6,186,629 B1 * | 2/2001 | Iwamura | ................ | G03B 33/12 353/34 |
| 6,204,975 B1 * | 3/2001 | Watters | .............. | G02B 21/0008 359/640 |

(Continued)

FOREIGN PATENT DOCUMENTS

JP      2019-174516 A    10/2019

*Primary Examiner* — Benyam Ketema
(74) *Attorney, Agent, or Firm* — Oliff PLC

(57) ABSTRACT

A display device includes: a first self-light-emitting panel; a second self-light-emitting panel; a cross dichroic prism configured to cause first image light and second image light to exit as image light of combined light, the first image light exiting from the first self-light-emitting panel and entering, the second image light exiting from the second self-light-emitting panel and entering; a first polarizing plate provided at an exit side of the first self-light-emitting panel; a second polarizing plate provided at an exit side of the second self-light-emitting panel; and a light-guiding optical system including a polarizing mirror and configured to deflect the image light of the combined light. Polarizing axes of the first polarizing plate and the second polarizing plate and a polarizing axis of the polarizing mirror are perpendicular to or parallel to an intersecting axis of the cross dichroic prism.

14 Claims, 22 Drawing Sheets

(56) References Cited

U.S. PATENT DOCUMENTS

| | | | | |
|---|---|---|---|---|
| 6,310,713 B2* | 10/2001 | Doany | G02B 27/0172 | 359/263 |
| 6,398,364 B1* | 6/2002 | Bryars | G02B 27/126 | 353/31 |
| 6,561,652 B1* | 5/2003 | Kwok | G02B 27/1026 | 353/31 |
| 6,597,504 B2* | 7/2003 | Dubin | G02B 27/283 | 359/485.06 |
| 7,502,078 B2* | 3/2009 | Suzuki | H04N 9/3105 | 349/97 |
| 7,967,443 B2* | 6/2011 | Ma | G02B 27/149 | 348/338 |
| 8,061,844 B2* | 11/2011 | Nagumo | G03B 21/28 | 353/20 |
| 8,480,239 B2* | 7/2013 | Sato | G03B 33/12 | 353/30 |
| 8,529,067 B2* | 9/2013 | Nakai | G03B 21/2073 | 353/30 |
| 8,807,755 B2* | 8/2014 | Ishimatsu | G02B 5/3058 | 349/193 |
| 8,810,914 B2* | 8/2014 | Amitai | G02B 27/106 | 385/36 |
| 10,075,682 B2* | 9/2018 | Ando | G03B 21/2033 | |
| 10,185,154 B2* | 1/2019 | Popovich | G03B 21/208 | |
| 10,437,064 B2* | 10/2019 | Popovich | G02B 6/0016 | |
| 10,678,053 B2* | 6/2020 | Waldern | G02B 27/48 | |
| 10,852,626 B2* | 12/2020 | Koshihara | G02B 27/0172 | |
| 2004/0105038 A1* | 6/2004 | Hashimoto | H04N 9/3105 | 349/5 |
| 2004/0109143 A1* | 6/2004 | Imahase | H04N 9/3167 | 353/31 |
| 2004/0239895 A1* | 12/2004 | Inamoto | G03B 21/10 | 353/98 |
| 2006/0044515 A1* | 3/2006 | Suzuki | H04N 9/3105 | 348/E9.027 |
| 2007/0188715 A1* | 8/2007 | Inazumi | G03B 21/14 | 353/30 |
| 2008/0042578 A1* | 2/2008 | Arai | H04N 9/3155 | 315/32 |
| 2008/0123056 A1* | 5/2008 | Matsubara | G03B 33/12 | 348/E9.026 |
| 2009/0067049 A1* | 3/2009 | Nakagawa | H04N 9/3167 | 359/489.17 |
| 2010/0202048 A1* | 8/2010 | Amitai | G02B 27/28 | 359/485.02 |
| 2011/0164221 A1* | 7/2011 | Tilleman | H04N 9/3167 | 359/489.08 |
| 2013/0271673 A1* | 10/2013 | Katou | H04N 9/3114 | 348/744 |
| 2014/0043379 A1* | 2/2014 | Suzuki | G09G 5/02 | 345/690 |
| 2014/0078474 A1* | 3/2014 | Nakao | H04N 9/3182 | 353/31 |
| 2014/0126056 A1* | 5/2014 | Amitai | G02B 6/272 | 359/489.07 |
| 2016/0041390 A1* | 2/2016 | Poon | G02B 5/3083 | 359/489.08 |
| 2017/0332056 A1* | 11/2017 | Ando | G03B 21/2013 | |
| 2019/0302466 A1 | 10/2019 | Koshihara et al. | | |
| 2020/0117075 A1* | 4/2020 | Koshihara | G02B 17/086 | |
| 2020/0133004 A1* | 4/2020 | Takeda | G02B 27/0172 | |
| 2020/0150436 A1* | 5/2020 | Fukase | G03H 1/0248 | |
| 2021/0041773 A1* | 2/2021 | Koshihara | G03B 21/10 | |
| 2021/0165226 A1* | 6/2021 | Ide | G02B 27/0179 | |
| 2021/0239989 A1* | 8/2021 | Ide | G02B 27/0172 | |
| 2022/0291577 A1* | 9/2022 | Akiyama | H04N 9/3108 | |

* cited by examiner

DISPLAY DEVICE AND COMPOSITE DISPLAY DEVICE

The present application is based on, and claims priority from JP Application Serial Number 2022-055323, filed on Mar. 30, 2022, the disclosure of which is hereby incorporated by reference herein in its entirety.

BACKGROUND

1. Technical Field

The present disclosure relates to a display device and a composite display device, which enable a virtual image to be observed.

2. Related Art

There is known a display device in which at least one or more deflection elements are provided between a dichroic prism and three light-emitting elements to narrow the wavelength region of each color light exiting from the light-emitting elements. There is a disclosure in which an image with high quality can be displayed without using a configuration in which, of light bean that exits from a panel, effective light beam used to display an image is significantly narrowed (JP-T-2019-174516).

However, JP-T-2019-174516 described above does not discuss details of an optical system configured to guide image light that exits from the optical unit to pupils of a user. Thus, there is a possibility that brightness deteriorates depending on an optical system employed.

SUMMARY

A display device according to one aspect of the present disclosure includes a first self-light-emitting panel, a second self-light-emitting panel of which wavelength of emitted light differs from that of the first self-light-emitting panel, a cross dichroic prism configured to cause first image light and second image light to exit as combined light from an exit surface, the first image light exiting from the first self-light-emitting panel and entering from a first incident surface, the second image light exiting from the second self-light-emitting panel and entering from a second incident surface, a first polarizing plate provided between the first self-light-emitting panel and the first incident surface, a second polarizing plate provided between the second self-light-emitting panel and the second incident surface, and a light-guiding optical system including a polarizing mirror and configured to deflect the combined light from the cross dichroic prism using the polarizing mirror, wherein polarizing axes of the first polarizing plate and the second polarizing plate and a polarizing axis of the polarizing mirror are perpendicular to or parallel to an intersecting axis of the cross dichroic prism.

A display device according to one aspect of the present disclosure includes a first self-light-emitting panel, a second self-light-emitting panel of which wavelength of emitted light differs from that of the first self-light-emitting panel, a dichroic prism configured to cause first image light and second image light to exit as combined light from an exit surface, the first image light exiting from the first self-light-emitting panel and entering from a first incident surface, the second image light exiting from the second self-light-emitting panel and entering from a second incident surface, a first polarizing plate provided between the first self-light-emitting panel and the first incident surface, a second polarizing plate provided between the second self-light-emitting panel and the second incident surface, and a light-guiding optical system including a polarizing mirror and configured to deflect the combined light from the dichroic prism using the polarizing mirror, wherein, when a first direction is a direction toward an other-side end from a one-side end located at a side of the first self-light-emitting panel with respect to the dichroic mirror of the dichroic prism, polarizing axes of the first polarizing plate and the second polarizing plate and a polarizing axis of the polarizing mirror are perpendicular to the first direction, and are parallel to or perpendicular to a second direction parallel to the dichroic mirror.

DESCRIPTION OF EXEMPLARY EMBODIMENTS

First Embodiment

Below, a display device according to a first embodiment of the present disclosure will be described with reference to FIGS. 1 and 2, or the like.

Figure 1:
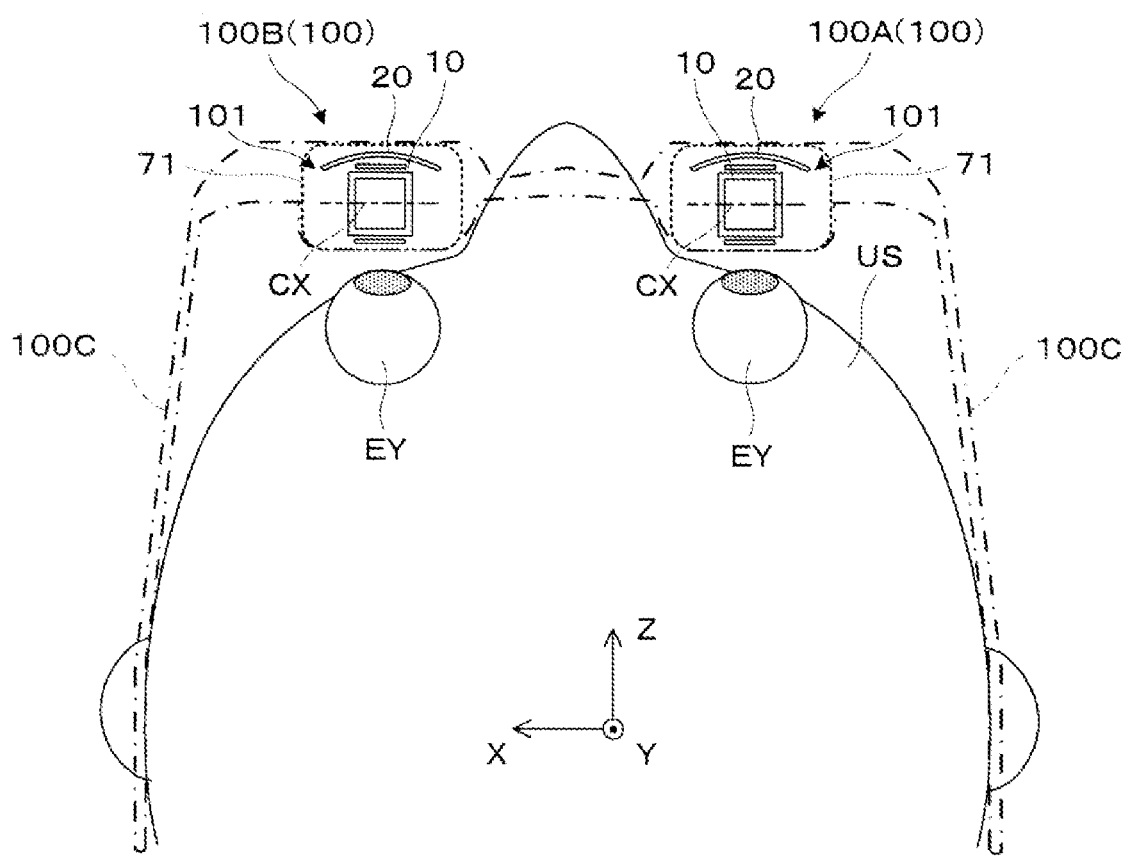
FIG. 1 is a plan view used to explain a state in which an HMD according to a first embodiment is worn.

FIG. 1 is a diagram used to explain a state in which a head-mounted display (hereinafter, also referred to as an HMD) 200 serving as a head-mounted display device. The HMD 200 is a composite display device 2, and enables an observer or a user US who wears this device to recognize an image serving as a virtual image. In FIG. 1 and the like, X, Y, and Z are an orthogonal coordinate system. The +X direction corresponds to a transverse direction in which the two eyes EY of an observer or user US who wears the HMD 200 are arranged. The +Y direction corresponds to an upward direction perpendicular to the transverse direction in which the two eyes EY of the user US are arranged. The +Z direction corresponds to a direction to the front or a forward direction for the user US. The ±Y directions are parallel to the vertical axis or the vertical direction.

The HMD 200 includes a first display device 100A for a right eye, a second display device 100B for a left eye, and a supporting unit 100C including a pair of temples configured to support the display devices 100A and 100B. The first display device 100A is an optical system that enables observation of a virtual image, and is disposed so as to cover the front of, that is, the +Z side of the eye EY of the user US. Thus, the first display device 100A and the second display device 100B are arranged side by side in the X direction that is the traverse direction. The first display device 100A and the second display device 100B are devices configured to be optically flipped over in the left-right direction. Thus, in the following description, the first display device 100A for a right eye will be used as a representative display device 100.

Figure 2:
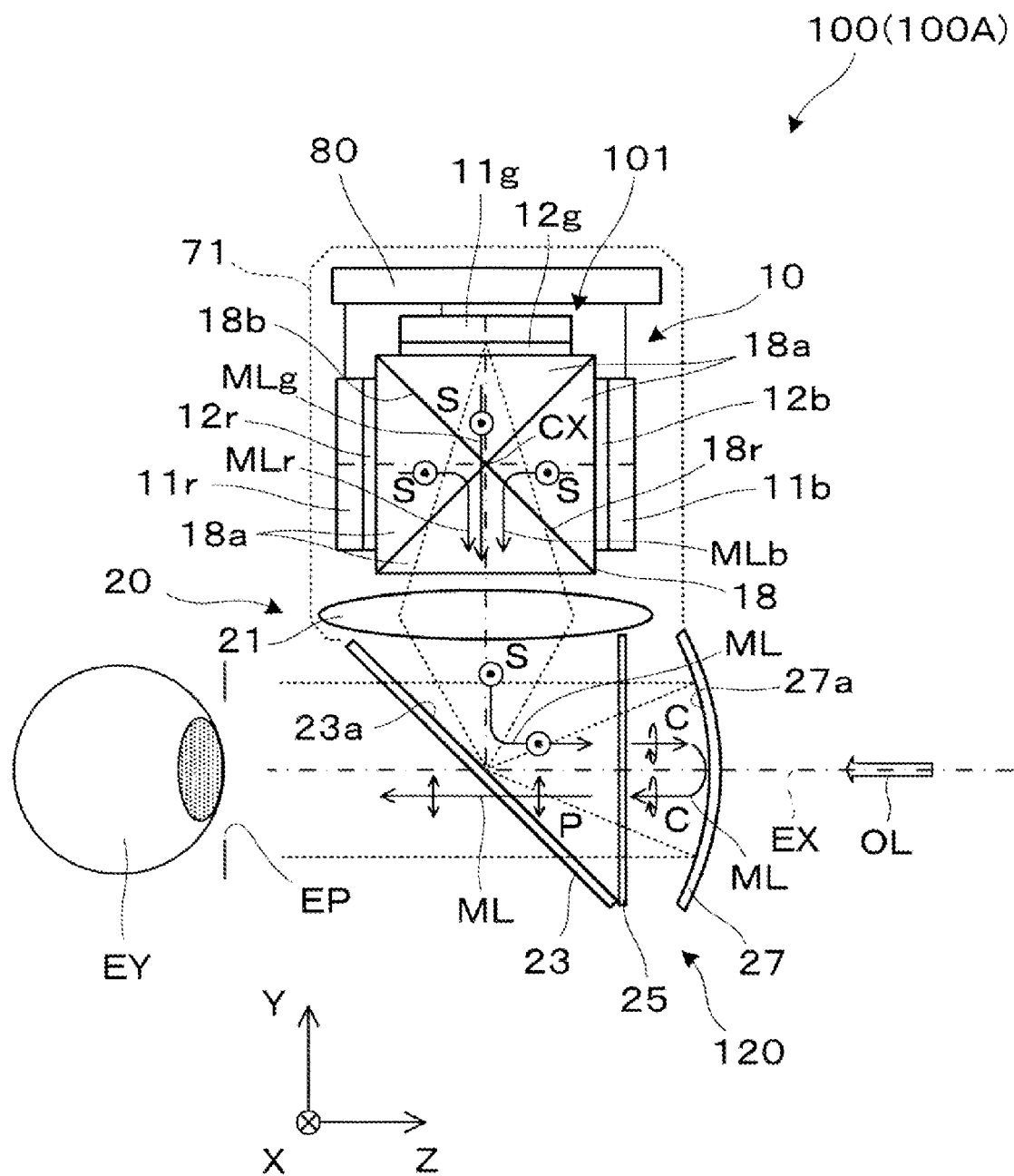
FIG. 2 is a conceptual side cross-sectional view used to explain an optical system within the HMD.

With reference to FIG. 2, the display device 100 includes an optical device 101 and a control device 80. The optical device 101 includes an image-light exiting unit 10 and an image-forming optical system 20. The image-light exiting unit 10 includes three self-light-emitting panels 11r, 11b, and 11g, three polarizing filters 12r, 12b, and 12g, and a cross dichroic prism 18. The image-forming optical system 20 includes a projection lens 21, a polarizing mirror 23, a wavelength plate 25, and a half mirror 27 in the order of the optical path from the image-light exiting unit 10 to an pupil position EP where the eye EY is disposed. A combination of the polarizing mirror 23, the wavelength plate 25, and the half mirror 27 is referred to as a light-guiding optical system 120. The image-light exiting unit 10 in which the self-light-emitting panels 11r, 11b, and 11g, the polarizing filters 12r, 12b, and 12g, and the cross dichroic prism 18 are integrated is accommodated in a case 71, and is held in a positioned state. The projection lens 21, the polarizing mirror 23, the wavelength plate 25, and the half mirror 27 are supported by a support portion (not illustrated) formed at a lower end of the case 71 in a state of being positioned relative to the image-light exiting unit 10.

Figure 3:
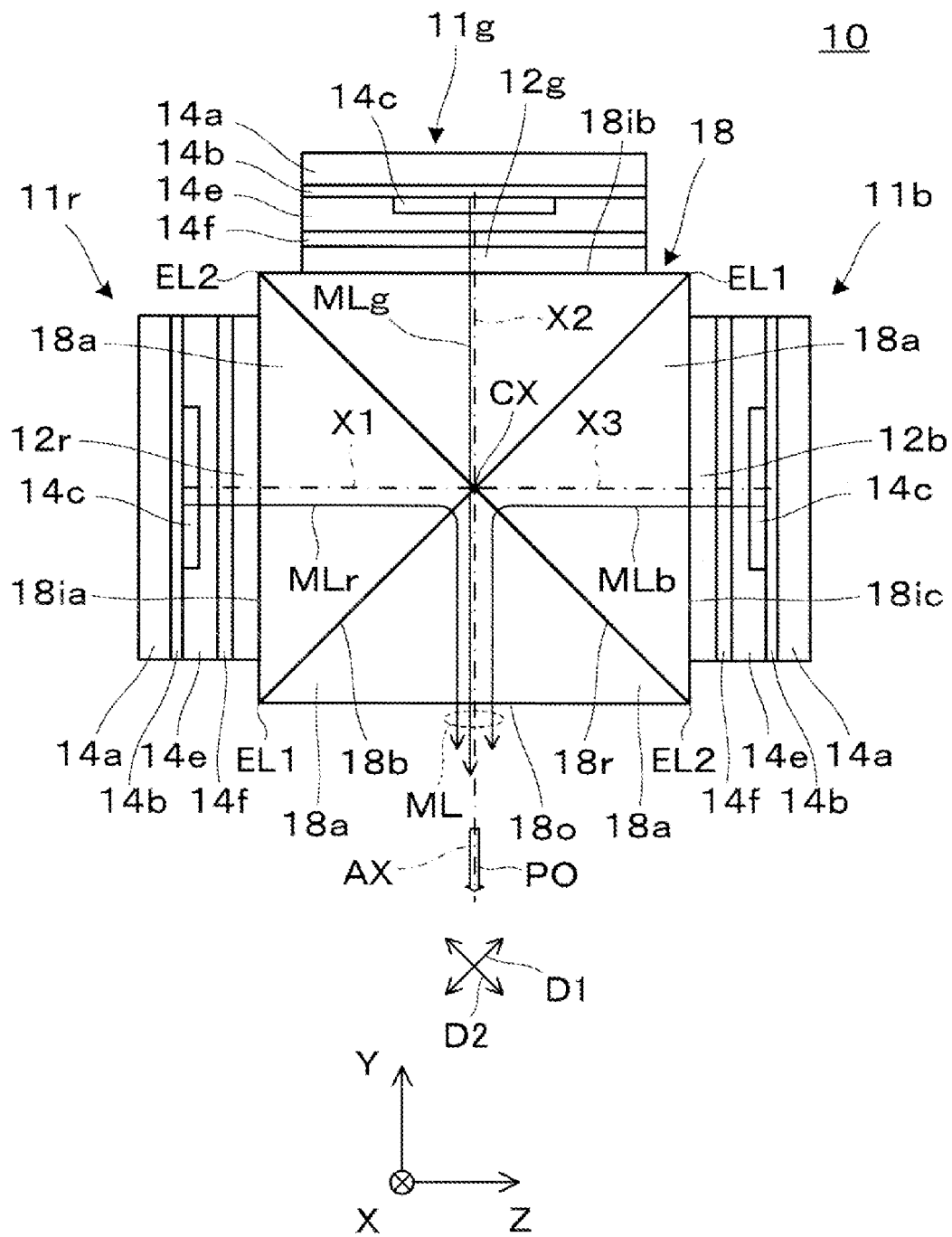
FIG. 3 is a side cross-sectional view used to explain a light-emitting display module.

With reference to FIG. 3, the self-light-emitting panel 11r for red color serves as a first self-light-emitting panel. The self-light-emitting panel 11r for red color is, for example, an organic EL (organic electroluminescence, Organic Electro-Luminescence) display, and forms a still image or video on a two-dimensional display surface parallel to the X-Y plane to cause a red image light MLr to exit. The red image light MLr is also referred to as first image light. The self-light-emitting panel 11r for red color is a display that does not have a polarization property, and forms the red image light MLr that is unpolarized light, to cause it to exit. The red image light MLr may be completely unpolarized light, or may be light of which balance of polarization is slightly biased. Specifically, the unpolarized light includes the red image light MLr of which light polarization state is small such that a difference is equal to or less than 30% between the amount of light in a first polarization direction that is caused to exit from the self-light-emitting panel 11r and the amount of light in a second polarization direction differing from the first polarization direction that is caused to exit from the self-light-emitting panel 11r. The self-light-emitting panel 11r for red color includes a substrate 14a, a light-emitting element layer 14b, a filter 14c, a glue layer 14e, and a transparent cover substrate 14f. The light-emitting element layer 14b includes a large number of pixel elements two-dimensionally arrayed along the X-Y plane. Although illustration is not given, the pixel elements each have a structure similar to a typical organic EL element, and each include a cathode, an electron-transporting layer, a light-emitting layer, hole transport, and a transparent electrode layer in this order from the substrate 14a side. The filter 14c limits the range of wavelength of the red image light MLr exiting from the light-emitting element layer 14b to improve a color characteristic of the self-light-emitting panel 11r. The filter 14c enhances efficiency of reflection of the red image light MLr by a dichroic mirror 18r of the cross dichroic prism 18 that will be described later.

The polarizing filter 12r is a first polarizing plate configured to limit the red image light MLr exiting from the self-light-emitting panel 11r for red color to polarized light in a specific polarization direction. The polarizing filter 12r has a lattice structure extending in a specific direction at an atomic level and formed, for example, by extending, in a specific direction, a polymetric material containing iodine compound or dye. The polarizing filter 12r is disposed between the self-light-emitting panel 11r for red color and the incident surface 18ia of the cross dichroic prism 18, and is joined to the self-light-emitting panel 11r and the cross dichroic prism 18 using a glue. In this case, the red image light MLr passing through the polarizing filter 12r is polarized light parallel to the X direction. In other words, the polarizing axis of the polarizing filter 12r serving as the first polarizing plate is parallel to an intersecting axis CX of the cross dichroic prism 18 that will be described later.

The self-light-emitting panel 11b for blue color serves as a second self-light-emitting panel. The self-light-emitting panel 11b for blue color is an organic EL display as with the self-light-emitting panel 11r for red color, and forms a still image or video on a two-dimensional display surface parallel to the X-Y plane to cause blue image light MLb to exit. The blue image light MLb is also referred to as second image light. The self-light-emitting panel 11b for blue color is a display that does not have a polarization property, and forms the blue image light MLb that is unpolarized light, to cause it to exit. The blue image light MLb may be completely unpolarized light. However, the unpolarized light includes the blue image light MLb in which the degree of polarization of the light polarization state is small. The self-light-emitting panel 11b for blue color includes the substrate 14a, the light-emitting element layer 14b, the filter 14c, the glue layer 14e, and the transparent cover substrate 14f. In the self-light-emitting panel 11b for blue color, the light-emitting element layer 14b includes a large number of pixel elements two-dimensionally arrayed along the X-Z plane. The light-emitting element layer 14b included in the self-light-emitting panel 11b for blue color has a structure similar to the light-emitting element layer 14b included in the self-light-emitting panel 11r for red color, and differs in the wavelength of emitted light from the light-emitting element layer 14b of the self-light-emitting panel 11r for red color. Note that, in the self-light-emitting panel 11b for blue color, the filter 14c limits the range of wavelength of the blue image light MLb exiting from the light-emitting element layer 14b to improve a color characteristic of the self-light-emitting panel 11b. The filter 14c enhances efficiency of reflection of the blue image light MLb by a dichroic mirror 18b of the cross dichroic prism 18 that will be described later.

The polarizing filter 12b is a second polarizing plate configured to limit the blue image light MLb exiting from the self-light-emitting panel 11b for blue color to polarized light in a specific polarization direction. The polarizing filter 12b has a structure similar to the polarizing filter 12r. The polarizing filter 12b is disposed so as to be interposed between the self-light-emitting panel 11b for blue color and the incident surface 18ic of the cross dichroic prism 18, and is joined to the self-light-emitting panel 11b and the cross dichroic prism 18 using a glue. In this case, the blue image light MLb passing through the polarizing filter 12b is polarized light parallel to the X direction. In other words, the polarizing axis of the polarizing filter 12b serving as the second polarizing plate is parallel to the intersecting axis CX of the cross dichroic prism 18.

The self-light-emitting panel 11g for green color serves as a third self-light-emitting panel. The self-light-emitting panel 11g for green color is an organic EL display as with the self-light-emitting panel 11r for red color, and forms a still image or video on a two-dimensional display surface parallel to the X-Z plane to cause green image light MLg to exit. The green image light MLg is also referred to as third image light. The self-light-emitting panel 11g for green color is a display that does not have a polarization property, and forms the green image light MLg that is unpolarized light, to cause it to exit. The green image light MLg may be completely unpolarized light. However, the unpolarized light includes the green image light MLg in which the degree of polarization of the light polarization state is small. The self-light-emitting panel 11g for green color includes the substrate 14a, the light-emitting element layer 14b, the filter 14c, the glue layer 14e, and the transparent cover substrate 14f. In the self-light-emitting panel 11g for green color, the light-emitting element layer 14b includes a large number of pixel elements two-dimensionally arrayed along the X-Z plane. The light-emitting element layer 14b included in the self-light-emitting panel 11g for green color has a structure similar to the light-emitting element layer 14b included in the self-light-emitting panel 11r for red color, and differs in the wavelength of emitted light from the light-emitting element layer 14b of the self-light-emitting panel 11r for red color or the light-emitting element layer 14b of the self-light-emitting panel 11g for green color. Note that, in the self-light-emitting panel 11b for green color, the filter 14c limits the range of wavelength of the green image light MLg exiting from the light-emitting element layer 14b to improve a color characteristic of the self-light-emitting panel 11g. The filter 14c enhances efficiency of transmission of the green image light MLg by dichroic mirrors 18r and 18b of the cross dichroic prism 18 that will be described later.

The polarizing filter 12g is a third polarizing plate configured to limit the green image light MLg exiting from the self-light-emitting panel 11g for green color to polarized light in a specific polarization direction. The polarizing filter 12g has a structure similar to the polarizing filter 12r. The polarizing filter 12g is disposed so as to be interposed between the self-light-emitting panel 11g for green color and the incident surface 18ib of the cross dichroic prism 18, and is joined to the self-light-emitting panel 11g and the cross dichroic prism 18 using a glue. In this case, the green image light MLg passing through the polarizing filter 12g is polarized light parallel to the X direction. In other words, the polarizing axis of the polarizing filter 12g serving as the third polarizing plate is parallel to the intersecting axis CX of the cross dichroic prism 18 that will be described later.

The cross dichroic prism 18 is a square post-shaped member, and includes three incident surfaces 18ia, 18ib, and 18ic and one exit surface 18o each serving as a side surface of a quadrangular prism. The two opposing incident surfaces 18ia and 18ic extend parallel to each other. The incident surface 18ib and the exit surface 18o extend parallel to each other. The two opposing incident surfaces 18ia and 18ic extend perpendicular to the incident surface 18ib provided between them. The incident surface 18ia is also referred to as a first incident surface. The incident surface 18ic is also referred to as a second incident surface. The incident surface 18ib is also referred to as a third incident surface.

The cross dichroic prism 18 is formed by joining four right triangle prisms 18a such that individual right-angled ridges match each other, and has a structure in which two dichroic mirrors 18r and 18b perpendicular to the boundary or joining portions of the four right triangle prisms 18a are embedded. Thus, the cross dichroic prism 18 includes two dichroic mirrors 18r and 18b that form an angle of 45° relative to the optical path PO from the cross dichroic prism 18 to the polarizing mirror 23.

The dichroic mirror 18r at one side extends perpendicular to a reference direction D1 that forms 45° relative to the Y direction and the Z direction and extends parallel to the Y-Z plane. In other words, the dichroic mirror 18r is disposed forming an angle of 45° relative to the incident surface 18ia or the incident surface 18ib. The dichroic mirror 18r forms a plane that couples opposing corners (specifically, two parallel sides EL2 at the outer side of a pair of the incident surface 18ib and the incident surface 18ic that are adjacent to each other) of the square contour as viewed from the axial direction of the cross dichroic prism 18.

The dichroic mirror 18b at the other side extends perpendicular to a reference direction D2 that is perpendicular to the reference direction D1, with the reference being the reference direction D1 that forms 45° relative to the Y direction and the Z direction and extends parallel to the Y-Z plane. In other words, the dichroic mirror 18b is disposed forming an angle of 45° relative to the incident surface 18ia or the incident surface 18ib. The dichroic mirror 18b forms a plane that couples opposing corners (specifically, two parallel sides EL1 at the outer side of a pair of the incident surface 18ia and the incident surface 18ib that are adjacent to each other) of the square contour as viewed from the axial direction of the cross dichroic prism 18.

The red image light MLr that has passed from the self-light-emitting panel 11r for red color through the polarizing filter 12r and entered the first incident surface 18ia of the cross dichroic prism 18 is reflected by the dichroic mirror 18r to be bent toward the exit side, that is, the optical axis AX side, and is caused to exit from the exit surface 18o to the outside in the −Y direction. The blue image light MLb that has passed from the self-light-emitting panel 11b for blue color through the polarizing filter 12b and entered the second incident surface 18ic of the cross dichroic prism 18 is reflected by the dichroic mirror 18b to be bent toward the exit side, that is, the optical axis AX side, and is caused to exit from the exit surface 18o to the outside in the −Y direction. The green image light MLg that has passed from the self-light-emitting panel 11g for green color through the polarizing filter 12g and entered the third incident surface 18ib of the cross dichroic prism 18 passes through toward the optical axis AX side without being reflected by the dichroic mirror 18r, 18b, and is caused to exit from the exit surface 18o to the outside in the −Y direction. That is, the cross dichroic prism 18 allows the green image light MLg to pass through. Thus, the cross dichroic prism 18 combines images to superimpose the red image light MLr, the green image light MLg, and the blue image light MLb, and causes the light to exit as the image light ML. Then, the cross dichroic prism 18 is able to cause the light to enter the polarizing mirror 23 through the projection lens 21 illustrated in FIG. 2.

Figure 4:
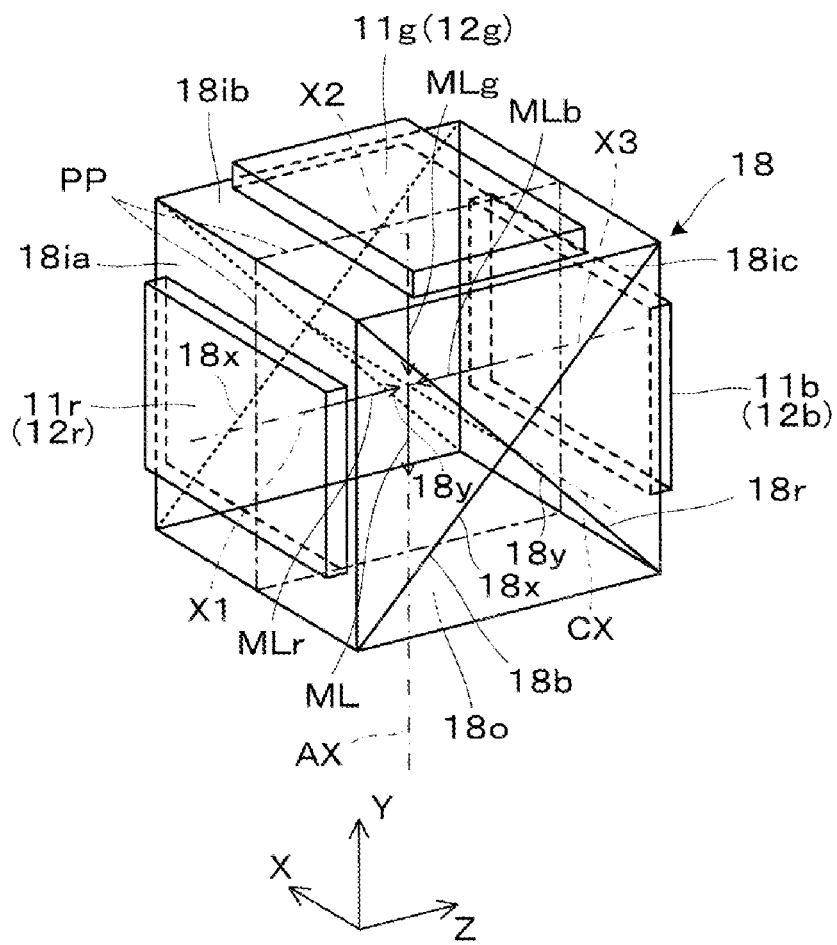
FIG. 4 is a perspective view used to explain a light-emitting display module.

With reference to FIG. 4, in the cross dichroic prism 18, the intersecting axis CX extends along the crossing line of two dichroic mirrors 18r and 18b, and is parallel to the X direction. A first optical axis X1 extends from the center of the self-light-emitting panel 11r for red color and along the intersecting axis CX of the cross dichroic prism 18, and is parallel to the Z direction. A second optical axis X2 extends from the self-light-emitting panel 11g for green color and along the intersecting axis CX of the cross dichroic prism 18, and is parallel to the Y direction. A third optical axis X3 extends from the self-light-emitting panel 11b for blue color and along the intersecting axis CX of the cross dichroic prism 18, and is parallel to the Z direction. The optical axis AX extends from the center of the intersecting axis CX and in the exit surface 18o of the cross dichroic prism 18, extends on the extended line of the second optical axis X2, and extends parallel to the Y direction. Of the image light ML, that is, the red image light MLr, the green image light MLg, and the blue image light MLb, the optical axis AX corresponds to a main beam of image light exiting from the center of the angle of view of the self-light-emitting panel 11r, 11b, 11g.

Figure 5:
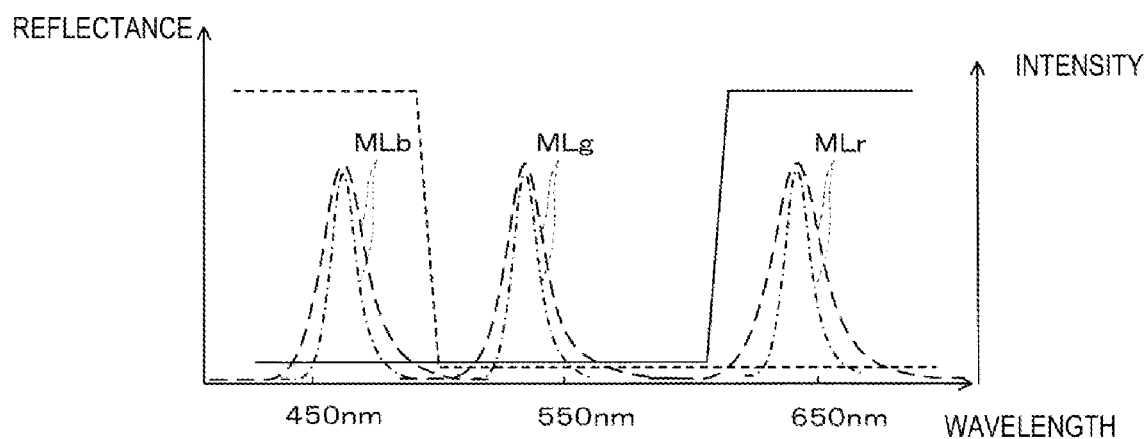
FIG. 5 is a conceptual diagram used to explain a reflection property of a dichroic mirror.

FIG. 5 is a conceptual diagram used to explain a reflection property of the dichroic mirror 18r, 18b illustrated in FIG. 3 or the like. In the graph in FIG. 5, the horizontal axis indicates wavelengths, and the vertical axis indicates reflectance. The solid line in the graph indicates the reflectance of the dichroic mirror 18r at one side with respect to the S-polarized light, and the dotted line indicates the reflectance of the dichroic mirror 18b at the other side with respect to the S-polarized light. The dichroic mirror 18r at one side reflects light having wavelengths of not less than 600 nm at reflectance of almost 100%. The dichroic mirror 18b at the other side reflects light having wavelengths of not more than 500 nm at reflectance of almost 100%.

In FIG. 5, the peak pattern indicated by the dashed line illustrates, as examples, the distribution of wavelength of the red image light MLr exiting from the light-emitting element layer 14b of the self-light-emitting panel 11r for red color, the distribution of wavelength of the green image light MLg exiting from the self-light-emitting panel 11g for green color, and the distribution of wavelength of the blue image light MLb exiting from the self-light-emitting panel for blue color 11r. The peak pattern indicated by the long dashed short dashed line illustrates, as an example, the distribution of wavelength of the red image light MLr after passing through the filter 14c, the distribution of wavelength of the green image light MLg, and the distribution of wavelength of the blue image light MLb.

With reference to FIG. 3 or the like, the red image light MLr that has exited from the self-light-emitting panel 11r for red color and has passed through the polarizing filter 12r is reflected by the dichroic mirror 18r with efficiency of almost 100%. In addition, the blue image light MLb that has exited from the self-light-emitting panel 11b for blue color and has passed through the polarizing filter 12b is reflected by the dichroic mirror 18b with efficiency of almost 100%. Note that the green image light MLg that has exited from the self-light-emitting panel 11g for green color and has passed through the polarizing filter 12g passes through the dichroic mirrors 18r and 18b with efficiency of almost 100%. Here, the red image light MLr that enters the dichroic mirror 18r from the self-light-emitting panel 11r for red color is S-polarized light having a polarizing axis parallel to the X direction. The blue image light MLb that enters the dichroic mirror 18b from the self-light-emitting panel 11b for blue color is S-polarized light having a polarizing axis parallel to the X direction. The green image light MLg that enters the dichroic mirrors 18r and 18b from the self-light-emitting panel 11g for green color is S-polarized light having a polarizing axis parallel to the X direction. In other words, the polarization directions of the red image light MLr, the blue image light MLb, and the green image light MLg are the first direction parallel to the X direction. As light that enters the dichroic mirrors 18r and 18b is unified into the S-polarized light, it is possible to reduce the angle dependency of the reflectance or transmittance, and it is possible to reduce the visual-field-angle dependency of the intensity of the red image light MLr, the blue image light MLb, and the green image light MLg that exit from the exit surface 18o of the cross dichroic prism 18.

With reference to FIG. 4, the deflection axis of the red image light MLr is perpendicular to a beam plane PP including a main beam exiting from the center of the self-light-emitting panel 11r and a reflected beam after the main beam is reflected by the dichroic mirror 18r. The deflection axis of the blue image light MLb is perpendicular to the beam plane PP including a main beam exiting from the center of the self-light-emitting panel 11b and a reflected beam after the main beam is reflected by the dichroic mirror 18b. The deflection axis of the green image light MLg is perpendicular to the beam plane PP common to the red image light MLr and the blue image light MLb. The beam plane PP is a plane including the normal line to the dichroic mirror 18r for red and a line parallel to a horizontal side 18x of the dichroic mirror 18r that is sloped. The beam plane PP is a plane including the normal line to the dichroic mirror 18b for blue and a line parallel to a horizontal side 18y of the dichroic mirror 18b that is sloped.

Returned to FIG. 2, the projection lens 21 is disposed so as to be opposed to the exit surface 18o of the cross dichroic prism 18. The projection lens 21 has positive power, and forms an intermediate image in a region of the polarizing mirror 23 at and around the center thereof. The projection lens 21 is not limited to a lens configured with a single lens, and it may be possible to employ a configuration in which a plurality of lenses are provided. The optical surface of the lens that constitutes the projection lens 21 is a spherical surface or an aspherical surface, and an anti-reflection coating is applied thereto.

The polarizing mirror 23 is a member having a flat surface or a flat-plate member that is opposed to the projection lens 21, and is disposed in a state of being sloped at 45° relative to the optical axis AX extending from the exit surface 18o of the cross dichroic prism 18. More specifically, the normal line to the polarizing mirror 23 is parallel to the Y-Z plane extending in the vertical direction, and is at 45° relative to the Y direction and the Z direction. The polarizing mirror 23 is a reflective-type polarizer, and is formed such that a polarized-light reflection film 23a is formed at a one-side surface of a flat plate-shaped optically transparent substrate. The polarized-light reflection film 23a is, for example, comprised of a dielectric multilayer film, reflects S-polarized light at high reflectance, and allows P-polarized light to pass through at high transmittance. The polarizing mirror 23 may be a wire grid polarizer in which the polarized-light reflection film 23a made of a fine stripe shaped metal grid is formed at a one-side surface of a flat plate-shaped optically transparent substrate.

The polarizing axis of the polarizing mirror 23 is parallel to the intersecting axis CX of the cross dichroic prism 18, and matches the polarizing axis of the polarizing filter 12r serving as the first polarizing plate or the polarizing axis of the polarizing filter 12b serving as the second polarizing plate.

The wavelength plate 25 is disposed perpendicular to the optical axis AX and at an optical path between the polarizing mirror 23 and the half mirror 27. The wavelength plate 25 is a λ/4 plate, and is made, for example, of a crystal-based material or resin-based material having birefringence. For the wavelength plate 25, it is desirable to use a plate that can achieve a phase difference or retardation corresponding to substantially λ/4 concerning each color of RGB. In addition, for the wavelength plate 25, it is desirable to use a plate having a property that compensates for incident-angle dependency in which the applied phase difference deviates from the targeted value due to the incident angle of the image light ML. The wavelength plate 25 is configured to convert the image light ML outputted from the cross dichroic prism 18 and reflected by the polarizing mirror 23, from the S-polarized light into circularly polarized light. The wavelength plate 25 is disposed such that the high-speed axis thereof forms 45° relative to the X direction and the Y direction within a flat surface perpendicular to the optical axis AX and parallel to the X-Y plane.

The half mirror 27 is disposed so as to be opposed to the wavelength plate 25 and cover the pupil position EP from the front, and is configured to collimate the image light ML from an intermediate image behind the wavelength plate 25. The half mirror 27 is a concave mirror that includes a concave surface, specifically a spherical surface or an aspherical surface, partially reflecting the image light ML reflected at the polarizing mirror 23 and passing through the wavelength plate 25. The half mirror 27 is a mirror obtained by attaching a transparent reflection film 27a to one side surface of a flat plate-shaped substrate. The transparent reflection film 27a is comprised of a dielectric multilayer film, or is comprised of a metal thin membrane or a multiple-layered film made of Al or the like. The half mirror 27 reflects the image light ML from the polarizing mirror 23, for example, at reflectance of approximately 50%. External light OL from the external side also enters the half mirror 27, and the half mirror 27 allows the external light OL to pass through, for example, at reflectance of approximately 50%.

The optical path will be described below. The cross dichroic prism 18 combines the red image light MLr in the S-polarized state and exiting from the self-light-emitting panel 11r and passing through the polarizing filter 12r, the blue image light MLb in the S-polarized state and exiting from the self-light-emitting panel 11b and passing through the polarizing filter 12b, and the green image light MLg in the S-polarized state and exiting from the self-light-emitting panel 11g and passing through the polarizing filter 12g. The combined light is caused to exit from the exit surface 18o of the cross dichroic prism 18 as colored combined light, that is, the image light ML. The image light ML in the S-polarized state and exiting from the cross dichroic prism 18 enters the polarizing mirror 23 through the projection lens 21, and is reflected by the polarizing mirror 23 at high reflectance. At this time, the image light ML forms an intermediate image. The image light ML reflected at the polarizing mirror 23 is converted from the S-polarized light into circularly polarized light at the time of passing through the wavelength plate 25. The image light ML that has passed through the wavelength plate 25 to become circularly polarized light enters the half mirror 27 to be reflected, for example, at 50% and be collimated. The collimated light travels in the reverse direction toward the wavelength plate 25, and passes through the wavelength plate 25 to be converted from the circularly polarized light into P-polarized light. The image light ML that has been converted into the P-polarized light passes through the polarizing mirror 23 at high transmittance. The image light ML that has passed through the polarizing mirror 23 enters the pupil position EP in a collimated state. Here, the pupil position EP is an pupil position, that is, an eye point of the image-forming optical system 20 where the eye EY is supposed to be located. Light from each point of the light-emitting element layers 14b provided at the self-light-emitting panels 11r, 11b, and 11g enters the pupil position so as to be collected at one location at an angle at which observation of a virtual image is possible. The external light OL also enters the half mirror 27 and the polarizing mirror 23 along an output optical axis EX parallel to the optical axis AX passing through the pupil position EP. In other words, the user US who wears the HMD 200 is able to observe a virtual image made out of the image light ML so as to overlap with the external image.

In the optical path described above, on the assumption that the polarizing filters 12r, 12b, and 12g reduce the light by, for example, 50% and the half mirror 27 reduces the light by, for example, 50%, the efficiency in using light of the display device 100 as a whole is 25%.

In the HMD 200 serving as the composite display device 2, the intersecting axis CX of the cross dichroic prism 18 included in the first display device 100A for the right eye EY extends parallel to the X direction that is the traverse direction, whereas the intersecting axis CX of the cross dichroic prism 18 included in second display device 100B for the left eye EY extends parallel to the X direction that is the traverse direction. In other words, the intersecting axis CX of the cross dichroic prism 18 included in the first display device 100A and the intersecting axis CX of the cross dichroic prism 18 included in the second display device 100B are parallel to each other, and extend in the traverse direction.

A modification example of the optical device 101 illustrated in FIG. 2 or the like will be described with reference to FIG. 6. In this case, the state of arrangement of the image-light exiting unit 10 including the cross dichroic prism 18 is rotated by 90° with the optical axis AX being the center by using, as a reference, the state of arrangement illustrated in FIG. 2. In other words, the self-light-emitting panel 11r and the self-light-emitting panel 11b are disposed so as to be spaced apart from each other in the traverse direction, that is, in the X direction with the cross dichroic prism 18 being interposed between them. In addition, the polarizing filter 12r for red limits the red image light MLr exiting from the self-light-emitting panel 11r for red color to polarized light of which polarizing axis is parallel to the Y direction. The polarizing filter 12b for blue limits the blue image light MLb exiting from the self-light-emitting panel 11b for blue color to polarized light of which polarizing axis is parallel to the Y direction. The polarizing filter 12g for green limits the green image light MLg exiting from the self-light-emitting panel 11g for green color to polarized light of which polarizing axis is parallel to the X direction. The cross dichroic prism 18 combines the red image light MLr in the P-polarized state and exiting from the self-light-emitting panel 11r and passing through the polarizing filter 12r, the blue image light MLb in the P-polarized state and exiting from the self-light-emitting panel 11b and passing through the polarizing filter 12b, and the green image light MLg in the P-polarized state and exiting from the self-light-emitting panel 11g and passing through the polarizing filter 12g. The combined light is caused to exit from the exit surface 18o of the cross dichroic prism 18 as colored combined light, that is, the image light ML. The image light ML exiting from the cross dichroic prism 18 enters the polarizing mirror 23 as S-polarized light through the projection lens 21.

Figure 6:
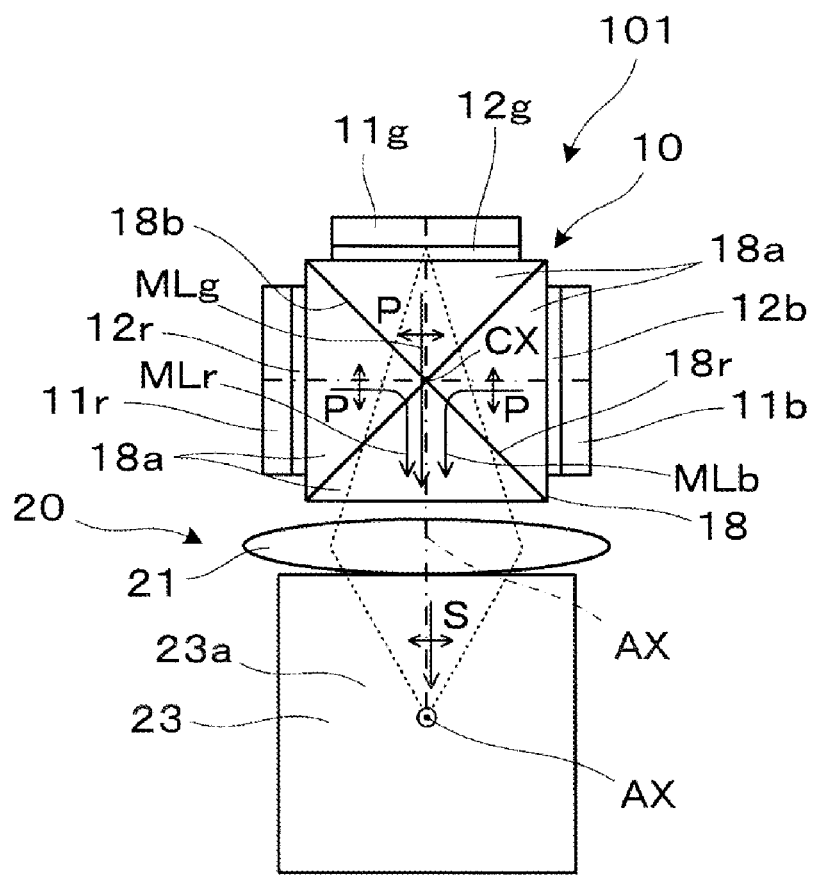
FIG. 6 is a conceptual front view used to explain an optical system of a modification example.

In the optical device 101 illustrated in FIG. 6, the polarizing axis of the polarizing filter 12r serving as the first polarizing plate extends in the Y direction perpendicular to the intersecting axis CX of the cross dichroic prism 18. The polarizing axis of the polarizing filter 12b serving as the second polarizing plate extends in the Y direction perpendicular to the intersecting axis CX of the cross dichroic prism 18. The polarizing axis of the polarizing filter 12g extends in the X direction perpendicular to the intersecting axis CX of the cross dichroic prism 18. The polarizing axis of the polarizing mirror 23 extends in the X direction perpendicular to the intersecting axis CX of the cross dichroic prism 18.

With the example illustrated in FIG. 6, as light that enters the dichroic mirrors 18r and 18b of the cross dichroic prism 18 is unified into the P-polarized light, it is possible to reduce the angle dependency of the reflectance or transmittance, and it is possible to reduce the visual-field-angle dependency of the intensity of the red image light MLr, the blue image light MLb, and the green image light MLg that exit from the exit surface 18o of the cross dichroic prism 18.

Another modification example of the optical device 101 illustrated in FIG. 2 or the like will be described with reference to FIG. 7. In this case, the state of arrangement of the image-light exiting unit 10 is similar to the state of arrangement illustrated in FIG. 2. However, the polarizing filter 12r for red limits the red image light MLr exiting from the self-light-emitting panel 11r for red color to polarized light of which polarizing axis is parallel to the Y direction. The polarizing filter 12b for blue limits the blue image light MLb exiting from the self-light-emitting panel 11b for blue color to polarized light of which polarizing axis is parallel to the Y direction. The polarizing filter 12g for green limits the green image light MLg exiting from the self-light-emitting panel 11g for green color to polarized light of which polarizing axis is parallel to the Z direction. The cross dichroic prism 18 combines the red image light MLr in the P-polarized state and exiting from the self-light-emitting panel 11r and passing through the polarizing filter 12r, the blue image light MLb in the P-polarized state and exiting from the self-light-emitting panel 11b and passing through the polarizing filter 12b, and the green image light MLg in the P-polarized state and exiting from the self-light-emitting panel 11g and passing through the polarizing filter 12g. The combined light is caused to exit from the exit surface 18o of the cross dichroic prism 18 as colored combined light, that is, the image light ML. The image light ML exiting from the cross dichroic prism 18 enters the polarizing mirror 23 as P-polarized light through the projection lens 21.

Figure 7:
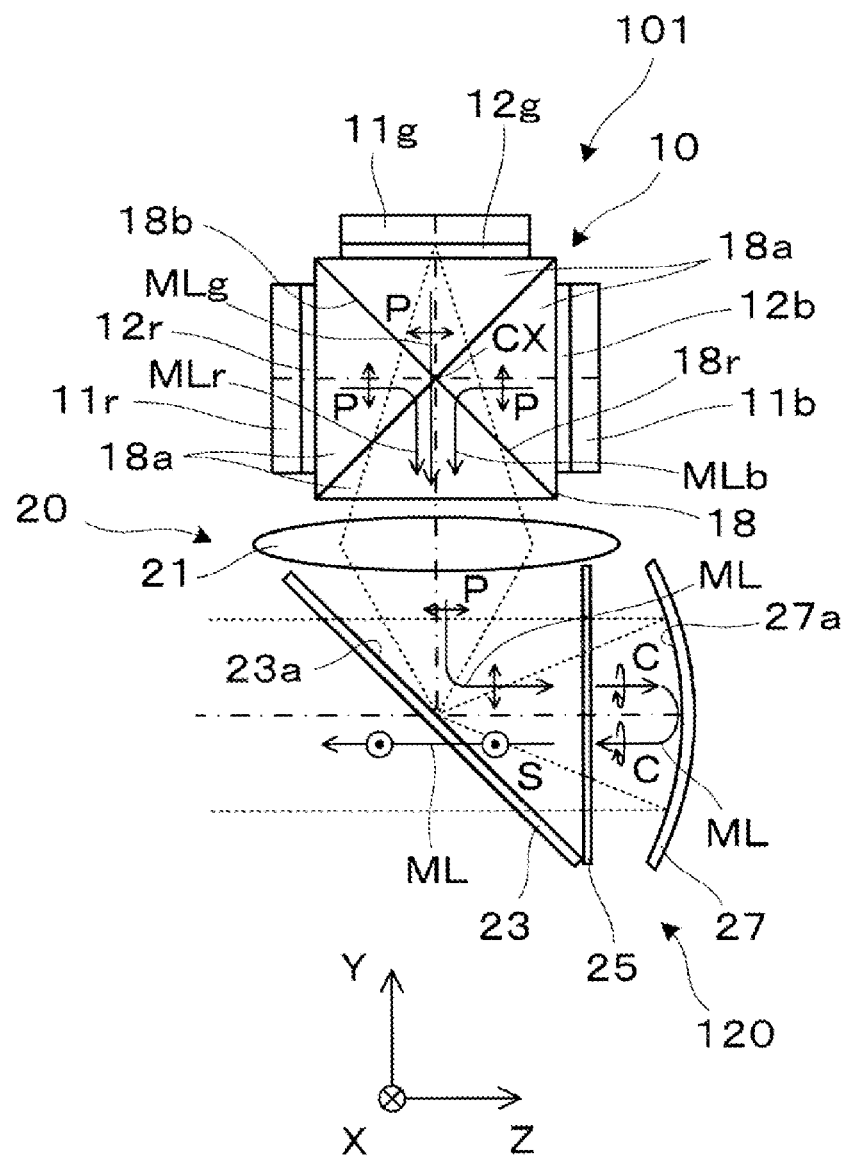
FIG. 7 is a conceptual side cross-sectional view used to explain another modification example.

In the example illustrated in FIG. 7, the image light ML that is the P-polarized light enters the polarizing mirror 23, and the polarizing mirror 23 is, for example, a polarizer comprised of wire grid or a dielectric multilayer film.

The image light ML reflected at the polarizing mirror 23 is converted from the P-polarized light into circularly polarized light at the time of passing through the wavelength plate 25. The image light ML that has passed through the wavelength plate 25 to become circularly polarized light enters the half mirror 27 to be partially reflected. Then, the light travels in the reverse direction toward the wavelength plate 25, and passes through the wavelength plate 25 to be converted from the circularly polarized light into S-polarized light. The image light ML that has been converted into the S-polarized light passes through the polarizing mirror 23 at high transmittance. The image light ML that has passed through the polarizing mirror 23 enters the pupil position EP in a collimated state.

In the optical device 101 illustrated in FIG. 7, the polarizing axis of the polarizing filter 12r serving as the first polarizing plate extends in the Y direction perpendicular to the intersecting axis CX of the cross dichroic prism 18. The polarizing axis of the polarizing filter 12b serving as the second polarizing plate extends in the Y direction perpendicular to the intersecting axis CX of the cross dichroic prism 18. The polarizing axis of the polarizing filter 12g extends in the Z direction perpendicular to the intersecting axis CX of the cross dichroic prism 18. The polarizing axis of the polarizing mirror 23 extends in an intermediate direction perpendicular to the intersecting axis CX of the cross dichroic prism 18 and between the Y direction and the Z direction.

Figure 8:
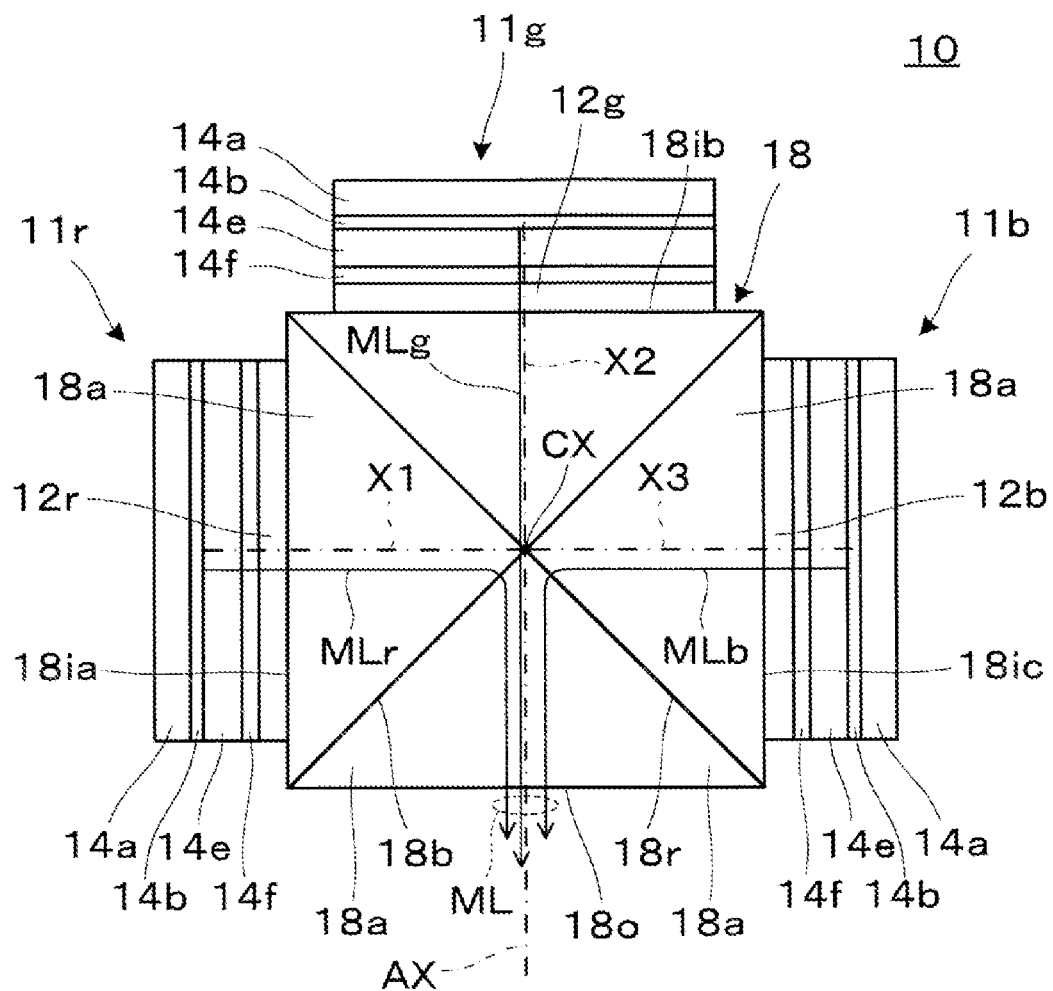
FIG. 8 is a conceptual side cross-sectional view used to explain yet another modification example.
Figure 8:
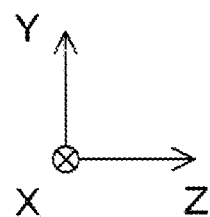

A modification example of the image-light exiting unit 10 illustrated in FIG. 2 or the like will be described with reference to FIG. 8. In this case, the filter 14c (see FIG. 3) is not provided in the self-light-emitting panel 11r, 11b, or 11g for each color. When the wavelength property of the light-emitting element layer 14b for the three colors does not include any sub-peak, and the wavelength property is narrowed to or around 460 nm, 540 nm, and 650 nm, for example, when a single-color OLED is used, the dichroic mirror 18r, 18b of the cross dichroic prism 18 also exhibits favorable transmission and reflection properties even if the filter 14c is not provided.

Figure 9:
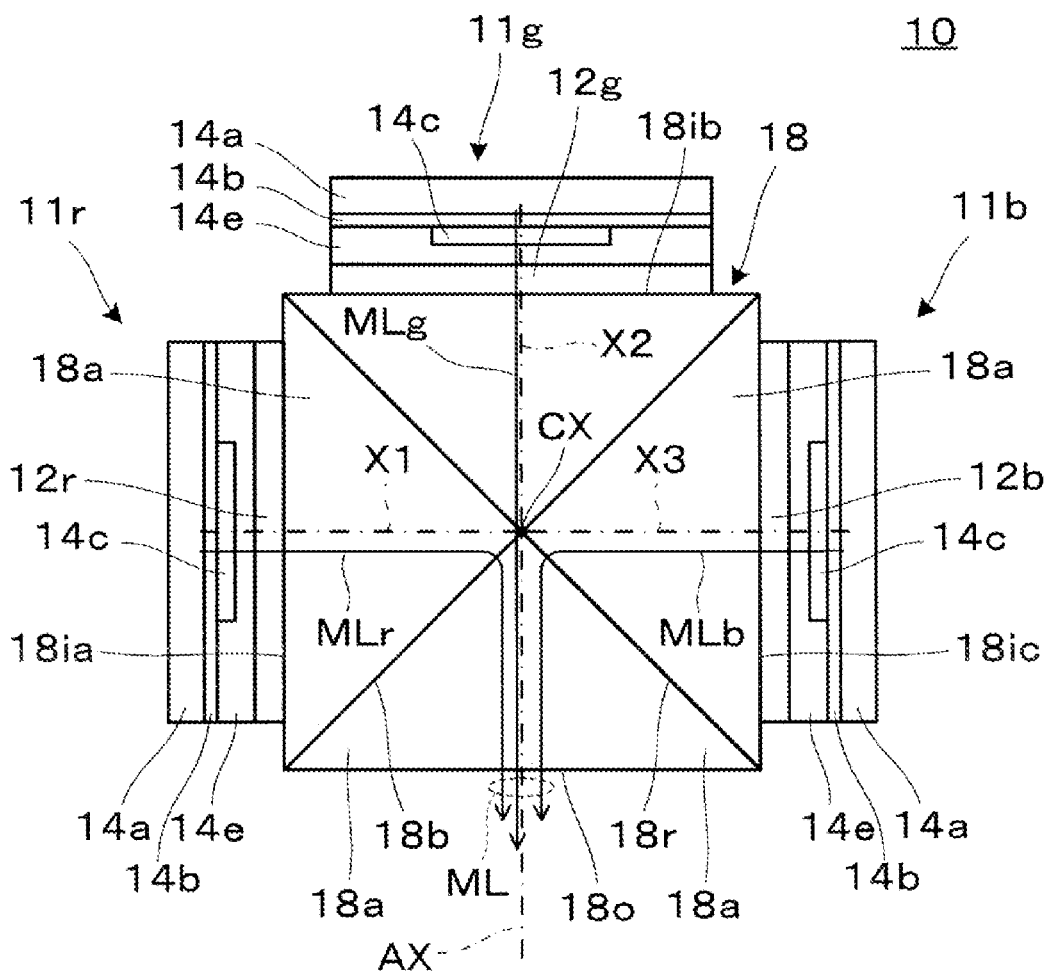
FIG. 9 is a conceptual side cross-sectional view used to explain yet another modification example.
Figure 9:
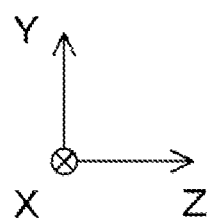

Another modification example of the image-light exiting unit 10 illustrated in FIG. 2 or the like will be described with reference to FIG. 9. In this case, the polarizing filter 12r, 12b, 12g for each color also has the function of the transparent cover substrate 14f (see FIG. 3), and the transparent cover substrate 14f is not provided in the self-light-emitting panel 11r, 11b, or 11g for each color.

Figure 10:
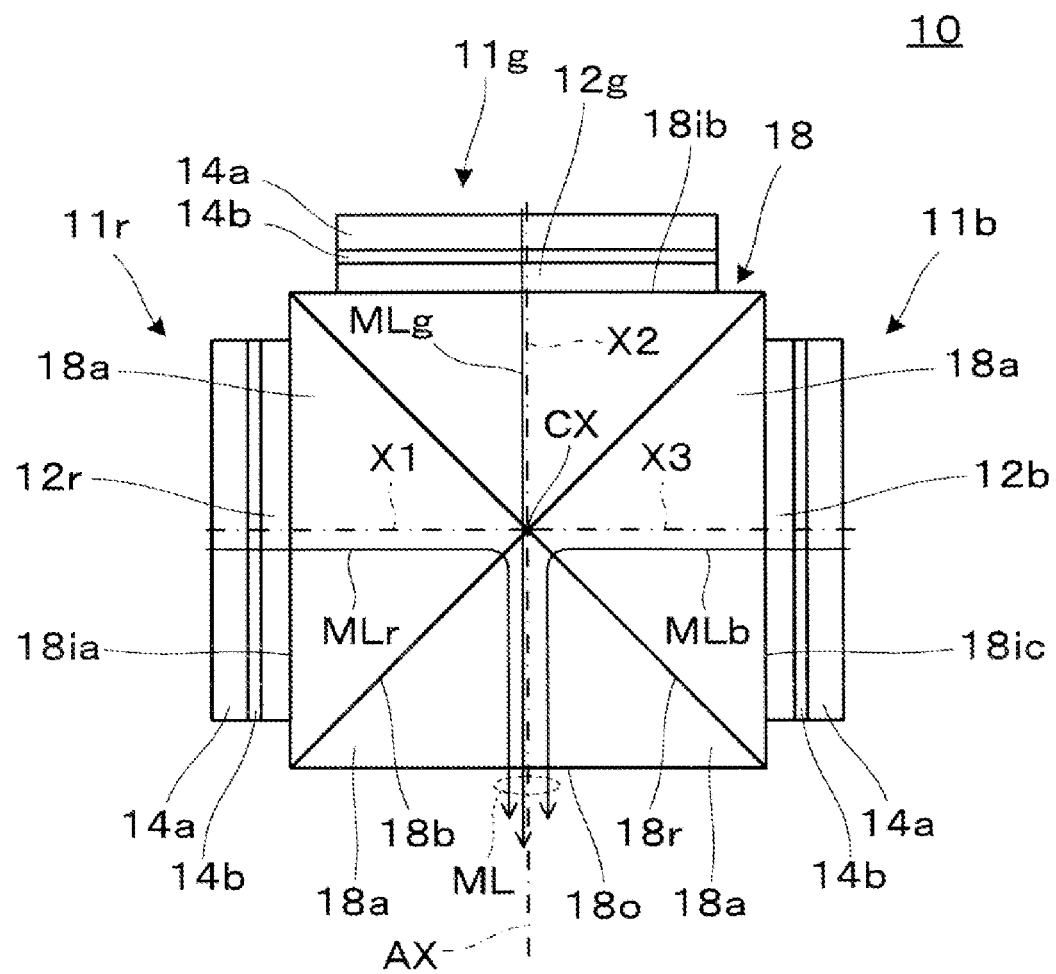
FIG. 10 is a conceptual side cross-sectional view used to explain yet another modification example.

Yet another modification example of the image-light exiting unit 10 illustrated in FIG. 2 or the like will be described with reference to FIG. 10. In this case, the structure of the self-light-emitting panel 11r, 11b, 11g for each color is further simplified. The self-light-emitting panel 11r, 11b, 11g for each color is comprised of the substrate 14a and the light-emitting element layer 14b.

Figure 11:
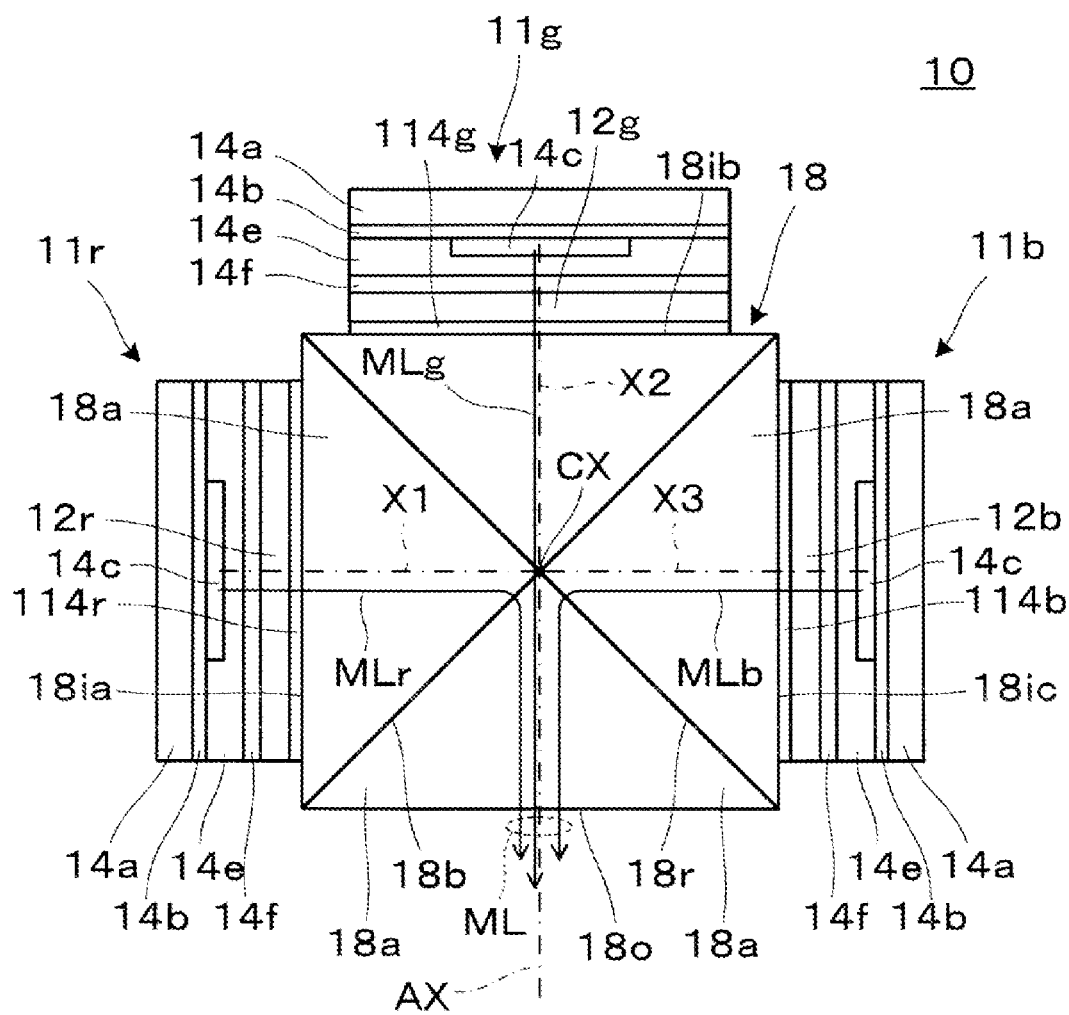
FIG. 11 is a conceptual side cross-sectional view used to explain yet another modification example.
Figure 11:
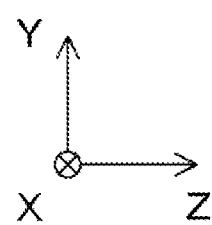

Yet another modification example of the image-light exiting unit 10 illustrated in FIG. 2 or the like will be described with reference to FIG. 11. In this case, a bandpass filter 114r, 114b, 114g is disposed between the polarizing filter 12r, 12b, 12g for each color and the incident surface 18ia, 18ic, 18ib of the cross dichroic prism 18 that is opposed to the polarizing filter 12r, 12b, 12g. The bandpass filters 114r, 114b, and 114g selectively allow the red image light MLr at or around the wavelength of 650 nm, the blue image light MLb at or around the wavelength of 460 nm, and the green image light MLg at or around the wavelength of 540 nm, respectively, to pass through. The bandpass filter 114r, 114b, 114g is fixed to the incident surface 18ia, 18ic, 18ib or the like using a glue. The bandpass filter 114r, 114b, 114g takes it into consideration that the dichroic mirror 18r, 18b does not completely function and transmission of light slightly occurs at the targeted wavelength, and makes it possible to reduce stray light to achieve a sharp image.

Figure 12:
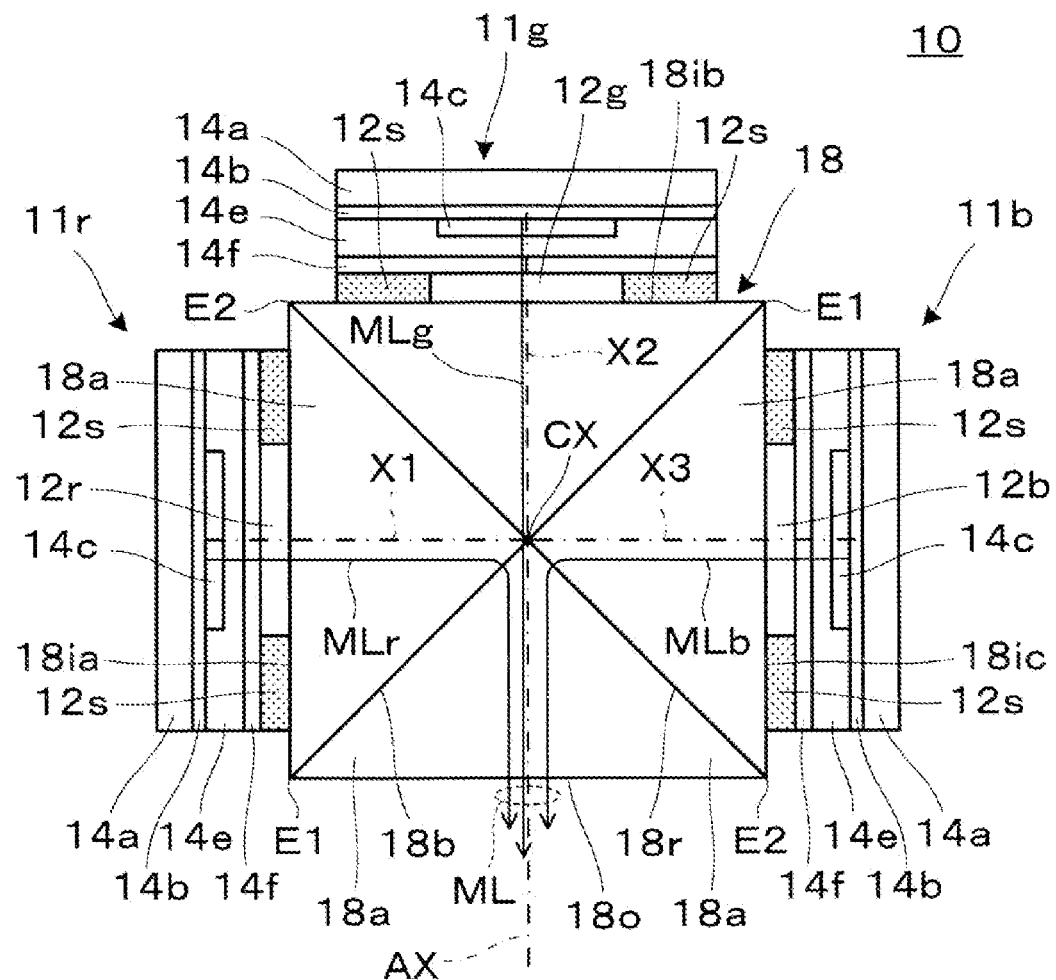
FIG. 12 is a conceptual side cross-sectional view used to explain yet another modification example.

Yet another modification example of the image-light exiting unit 10 illustrated in FIG. 2 or the like will be described with reference to FIG. 12. In this case, a light shielding layer 12s is provided around the polarizing filter 12r, 12b, 12g for each color. With the light shielding layer 12s, it is possible to suppress unnecessary light entering the cross dichroic prism 18 from the vicinity of the light-emitting portion to prevent stray light from being formed. The light shielding layer 12s is not necessary to be embedded in the polarizing filter 12r, 12b, 12g. For example, it may be possible to employ a configuration in which the light shielding layer 12s is disposed between the polarizing filter 12r, 12b, 12g and the self-light-emitting panel 11r, 11b, 11g or a configuration in which the light shielding layer 12s is embedded in the self-light-emitting panel 11r, 11b, 11g.

Figure 13:
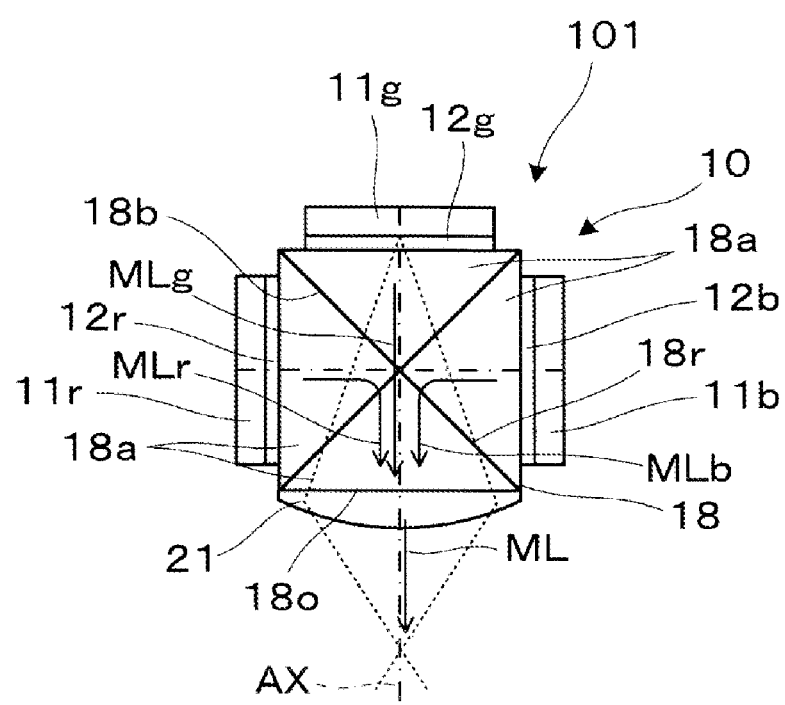
FIG. 13 is a conceptual side cross-sectional view used to explain yet another modification example.

Yet another modification example of the image-light exiting unit 10 illustrated in FIG. 2 or the like will be described with reference to FIG. 13. In the image-light exiting unit 10, the projection lens 21 is joined to the exit surface 18o of the cross dichroic prism 18. The projection lens 21 is a plano-convex lens having positive power, and forms an intermediate image as with the projection lens 21 illustrated in FIG. 2. The projection lens 21 is not limited to a lens that is manufactured separately from the cross dichroic prism 18 and is joined, and may be a lens formed integrally with the right triangle prism 18a. In this case, the exit surface 18o of the cross dichroic prism 18 is a convex surface.

As described above, the display device 100 illustrated in FIGS. 2 to 13 according to the present embodiment includes: the first self-light-emitting panel 11r; the second self-light-emitting panel 11b of which wavelength of emitted light differs from that of the first self-light-emitting panel 11r; the cross dichroic prism 18 configured to cause the first image light MLr and the second image light MLb to exit as the image light ML of the combined light from the exit surface 18o, the first image light MLr exiting from the first self-light-emitting panel 11r and entering from the first incident surface 18ia, the second image light MLb exiting from the second self-light-emitting panel 11b and entering from the second incident surface 18ic; the first polarizing plate 12r provided between the first self-light-emitting panel 11r and the first incident surface 18ia; the second polarizing plate 12b provided between the second self-light-emitting panel 11b and the second incident surface 18ic; and the light-guiding optical system 120 including the polarizing mirror 23 and configured to deflect the image light ML of the combined light from the cross dichroic prism 18 using the polarizing mirror 23, in which polarizing axes of the first polarizing plate 12r and the second polarizing plate 12b and a polarizing axis of the polarizing mirror 23 are perpendicular to or parallel to the intersecting axis CX of the cross dichroic prism 18. In this case, the image light ML deflected in a unified manner is caused to enter the dichroic mirror 18b, 18r of the cross dichroic prism 18; it is possible to suppress a reduction in brightness of the image light ML; and it is possible to achieve observation of a bright image.

Yet another modification example of the image-light exiting unit 10 illustrated in FIG. 2 or the like will be described with reference to FIG. 14. In this case, the image-light exiting unit 10 includes two self-light-emitting panels 11m and 11g, two polarizing filters 12m and 12g, and a dichroic prism 118. Here, the self-light-emitting panel 11m serves as the first self-light-emitting panel, and the self-light-emitting panel 11g serves as the second self-light-emitting panel.

The self-light-emitting panel 11m is used for both red color and blue color. The self-light-emitting panel 11m of two-color combined type has a structure similar to the self-light-emitting panel 11r for red color illustrated in FIG. 3. The light-emitting element layer 14b forms a two-dimensional pattern in red and blue, and image light MLm including red image light MLr and blue image light MLb exits. The self-light-emitting panel 11g for green color is the same as the self-light-emitting panel 11g for green color illustrated in FIG. 3. The polarizing filter 12m limits the image light MLm including red image light MLr and blue image light MLb and exiting from the self-light-emitting panel 11m of two-color combined type to polarized light of which polarizing axis is parallel to the X direction, and causes it to enter the incident surface 18ic of the dichroic prism 118. The polarizing filter 12g for green color is the same as the polarizing filter 12g for green color illustrated in FIG. 3.

The dichroic prism 118 includes a single dichroic mirror 18m. The dichroic mirror 18m extends perpendicular to the reference direction D2 that is perpendicular to the reference direction D1, with the reference being the reference direction D1 that forms 45° relative to the Y direction and the Z direction and extends parallel to the Y-Z plane.

The polarizing axis of the polarizing filter 12m serving as the first polarizing plate is parallel to the X direction perpendicular to the pair of the reference directions D1 and D2. Thus, when a first direction D11 represents a direction toward the opposing surface 18s at the other-side end from the incident surface 18ic at a one-side end located at the side of the self-light-emitting panel 11m serving as the first self-light-emitting panel, the polarizing axis of the polarizing filter 12m is perpendicular to the first direction D11, and is parallel to the direction parallel to the dichroic mirror 18m, that is, a second direction D12, with respect to the dichroic mirror 18m of the dichroic prism 118. Here, the first direction D11 corresponds to the −Z direction, and the second direction D12 corresponds to the −X direction.

Similarly, the polarizing axis of the polarizing filter 12g serving as the second polarizing plate is parallel to the X direction perpendicular to the pair of reference directions D1 and D2. Thus, the polarizing axis of the polarizing filter 12g is perpendicular to the first direction D11, and is parallel to the second direction D12 parallel to the dichroic mirror 18m.

Figure 14:
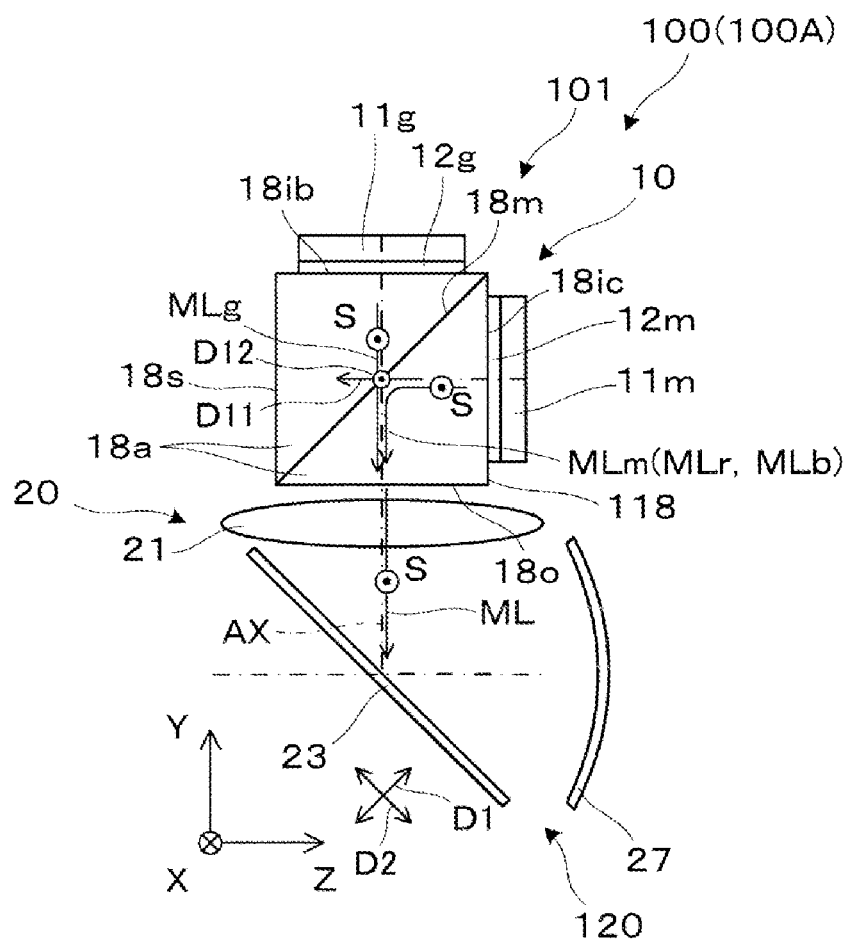
FIG. 14 is a conceptual side cross-sectional view used to explain yet another modification example.
Figure 15:
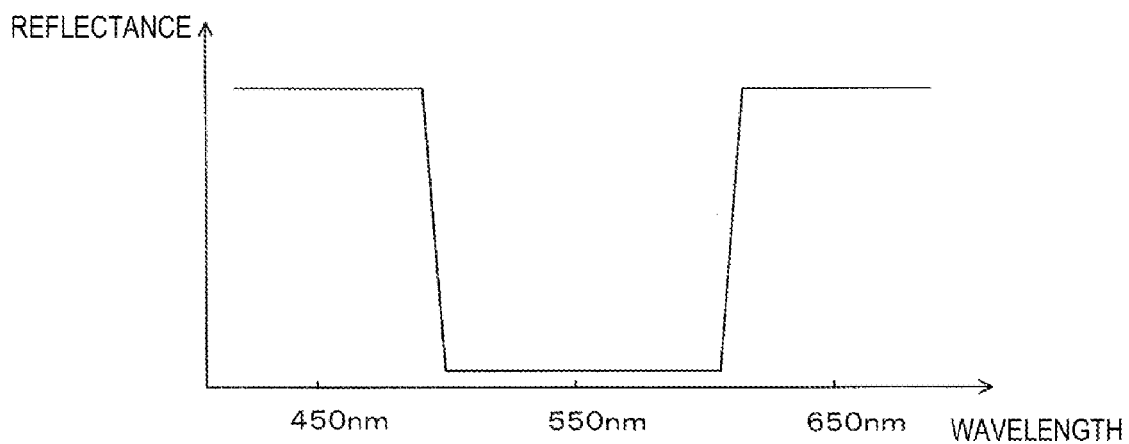
FIG. 15 is a conceptual diagram used to explain a reflection property of a dichroic mirror.

FIG. 15 is a conceptual diagram used to explain a reflection property of the dichroic mirror 18m illustrated in FIG. 14. In the graph, the solid line indicates the reflectance of the dichroic mirror 18m with respect to S-polarized light. The dichroic mirror 18m reflects light having a wavelength of not less than 600 nm and light having a wavelength of not more than 500 nm at reflectance of almost 100%.

S-polarized light of which polarizing axis is parallel to the X direction exits as the image light ML from the exit surface 18o of the dichroic prism 118 illustrated in FIG. 14, and the image light ML enters the projection lens 21. The image-light exiting unit 10 illustrated in FIG. 14 includes the dichroic prism 118 having a simplified structure, and there is no element corresponding to the crossing line of the dichroic mirrors 18r and 18b in the image-light exiting unit 10 illustrated in FIG. 2.

The polarizing axis of the polarizing mirror 23 that the image light ML coming from the dichroic prism 118 enters is parallel to the X direction perpendicular to the pair of reference direction D1 and D2. Thus, the polarizing axis of the polarizing mirror 23 is perpendicular to the first direction D11, and is parallel to the direction parallel to the dichroic mirror 18m, that is, to the second direction D12. Note that, although detailed description will not be given, it is possible to arrange the polarization direction of the image light MLm or the image light MLb and the polarizing axis of the polarizing filter 12m, 12g in a manner similar to that in FIG. 6, and it may be possible to arrange them so as to be perpendicular to the second direction D12. The polarizing axis of the polarizing mirror may also be perpendicular to the second direction D12.

As described above, the display device 100 according to the present embodiment and illustrated in FIG. 14 includes: the first self-light-emitting panel 11m; the second self-light-emitting panel 11g of which wavelength of emitted light differs from that of the first self-light-emitting panel 11m; the dichroic prism 118 configured to cause the first image light MLm and the second image light MLg to exit as the image light ML of combined light from the exit surface 18o, the first image light MLm exiting from the first self-light-emitting panel 11m and entering from the first incident surface 18ic, the second image light MLg exiting from the second self-light-emitting panel 11g and entering from the second incident surface 18ib, the polarizing filter 12m serving as the first polarizing plate and provided between the first self-light-emitting panel 11m and the first incident surface 18ic; the polarizing filter 12g serving as the second polarizing plate and provided between the second self-light-emitting panel 11g and the second incident surface 18ib; and the light-guiding optical system 120 including the polarizing mirror 23 and configured to deflect the image light ML that is the combined light from the dichroic prism 118 using the polarizing mirror 23. Here, when the first direction D11 is a direction from a one-side located at the first self-light-emitting panel 11m side toward an other-side end with respect to the dichroic mirror 18m of the dichroic prism 118, the polarizing axes of the polarizing filter 12m serving as the first polarizing plate and the polarizing filter 12g serving as the second polarizing plate and the polarizing axis of the polarizing mirror 23 are perpendicular to the first direction D11, and are parallel to or perpendicular to the second direction D12 parallel to the dichroic mirror 18m. In this case, the image light ML deflected in a unified manner is caused to enter the dichroic mirror 18m of the dichroic prism 118; it is possible to suppress a reduction in brightness of the image light ML; and it is possible to achieve observation of a bright image.

More specifically, in the display device 100 illustrated in FIG. 14, the first self-light-emitting panel 11m causes the first image light MLm, that is, the first image light MLr and the third image light MLb to exit at two wavelengths of emitted light differing from each other and differing from the wavelength of emitted light of the second self-light-emitting panel 11g.

As for the displayed device 100 illustrated in FIG. 14, it is possible to change combinations of colors. For example, it may be possible to employ a configuration in which the self-light-emitting panel 11m serving as the first self-light-emitting panel forms a blue image and a green image, and the blue image light MLb and the green image light MLg are reflected at the dichroic mirror 18m.

Yet another modification example of the image-light exiting unit 10 illustrated in FIGS. 2 and 14, or the like will be described with reference to FIG. 16. In this case, the image-light exiting unit 10 includes three dichroic prisms 118B, 118G, and 118R. The first dichroic prism 118B includes the dichroic mirror 18b, and reflects S-polarized light having a wavelength frequency band of blue. The second dichroic prism 118G includes the dichroic mirror 18g, and reflects S-polarized light having a wavelength frequency band of green while allowing light having a wavelength frequency band of blue to pass through. The third dichroic prism 118R includes the dichroic mirror 18r, and reflects S-polarized light having a wavelength frequency band of red while allowing light having wavelengths frequency band of blue and green to pass through.

The blue image light MLb exiting from the self-light-emitting panel 11b for blue color is limited by the polarizing filter 12b to S-polarized light of which polarizing axis is parallel to the X direction, and the light enters the incident surface 18i of the dichroic prism 118B. The blue image light MLb reflected by the dichroic mirror 18b included in the dichroic prism 118B as S-polarized light is caused to exit from the exit surface 18o of the dichroic prism 118B. The green image light MLg exiting from the self-light-emitting panel 11g for green color is limited by the polarizing filter 12g to S-polarized light of which polarizing axis is parallel to the X direction, and the light enters the incident surface 18i of the dichroic prism 118G. The green image light MLg reflected by the dichroic mirror 18g included in the dichroic prism 118G as S-polarized light is caused to exit from the exit surface 18o of the dichroic prism 118G. The red image light MLr exiting from the self-light-emitting panel 11r for red color is limited by the polarizing filter 12r to S-polarized light of which polarizing axis is parallel to the X direction, and the light enters the incident surface 18i of the dichroic prism 118R. The red image light MLr reflected by the dichroic mirror 18r included in the dichroic prism 118R as S-polarized light is caused to exit from the exit surface 18o of the dichroic prism 118R. Note that the blue image light MLb exiting from the dichroic prism 118B passes through the dichroic prisms 118G and 118R. The green image light MLg exiting from the dichroic prism 118G passes through the dichroic prism 118R. Thus, the blue image light MLb exiting from the self-light-emitting panel 11b, the green image light MLg exiting from the self-light-emitting panel 11g, and the red image light MLr exiting from the self-light-emitting panel 11r are combined, and are caused to exit from the dichroic prism 118R as combined light, that is, the image light ML.

Thus, when the first direction D11 represents a direction from the one-side end located at the self-light-emitting panel 11b serving as the third self-light-emitting panel toward the other-side end, the polarizing axis of the polarizing filter 12b serving as the first polarizing plate is perpendicular to the first direction D11, and is parallel to a direction parallel to the dichroic mirror 18b, that is, to the second direction D12, with respect to the dichroic mirror 18b of the dichroic prism 118B. When the first direction D11 represents a direction from the one-side end located at the side of the self-light-emitting panel 11g serving as the second self-light-emitting panel toward the other-side end, the polarizing axis of the polarizing filter 12g serving as the second polarizing plate is perpendicular to the first direction D11, and is parallel to a direction parallel to the dichroic mirror 18g, that is, to the second direction D12, with respect to the dichroic mirror 18g of the dichroic prism 118G. When the first direction D11 represents a direction from the one-side end located at the side of the self-light-emitting panel 11r serving as the first self-light-emitting panel toward the other-side end, the polarizing axis of the polarizing filter 12r serving as the first polarizing plate is perpendicular to the first direction D11, and is parallel to a direction parallel to the dichroic mirror 18r, that is, to the second direction D12, with respect to the dichroic mirror 18r of the dichroic prism 118R. Thus, the polarizing axis of the polarizing mirror 23 (see FIG. 14) that the image light ML from the dichroic prism 118R enters is perpendicular to the first direction D11, and is parallel to the direction parallel to the dichroic mirror 18m, in other words, to the second direction D12.

Figure 16:
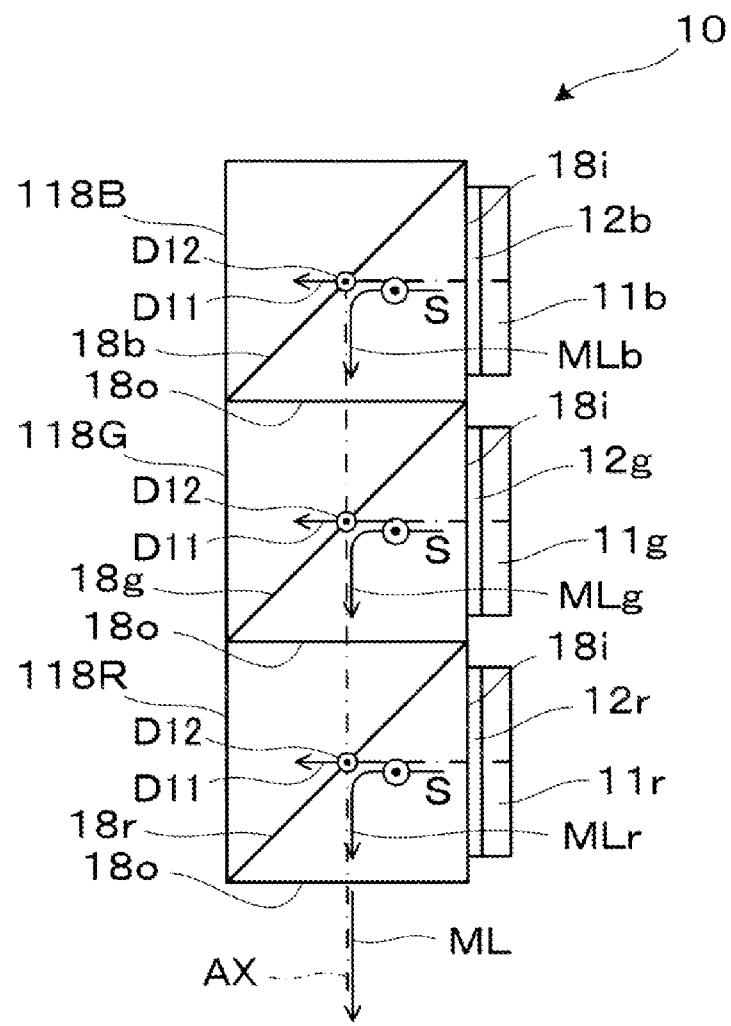
FIG. 16 is a conceptual side cross-sectional view used to explain yet another modification example.

In FIG. 16, the order of arrangement, in the vertical Y direction, of the three dichroic prisms 118B, 118G, and 118R may be switched.

Second Embodiment

Below, a display device according to a second embodiment of the present disclosure will be described. Note that a head-mounted display device according to the second embodiment is a device obtained by partially modifying the display device according to the first embodiment, and hence, explanation of common portions will not be repeated.

Figure 17:
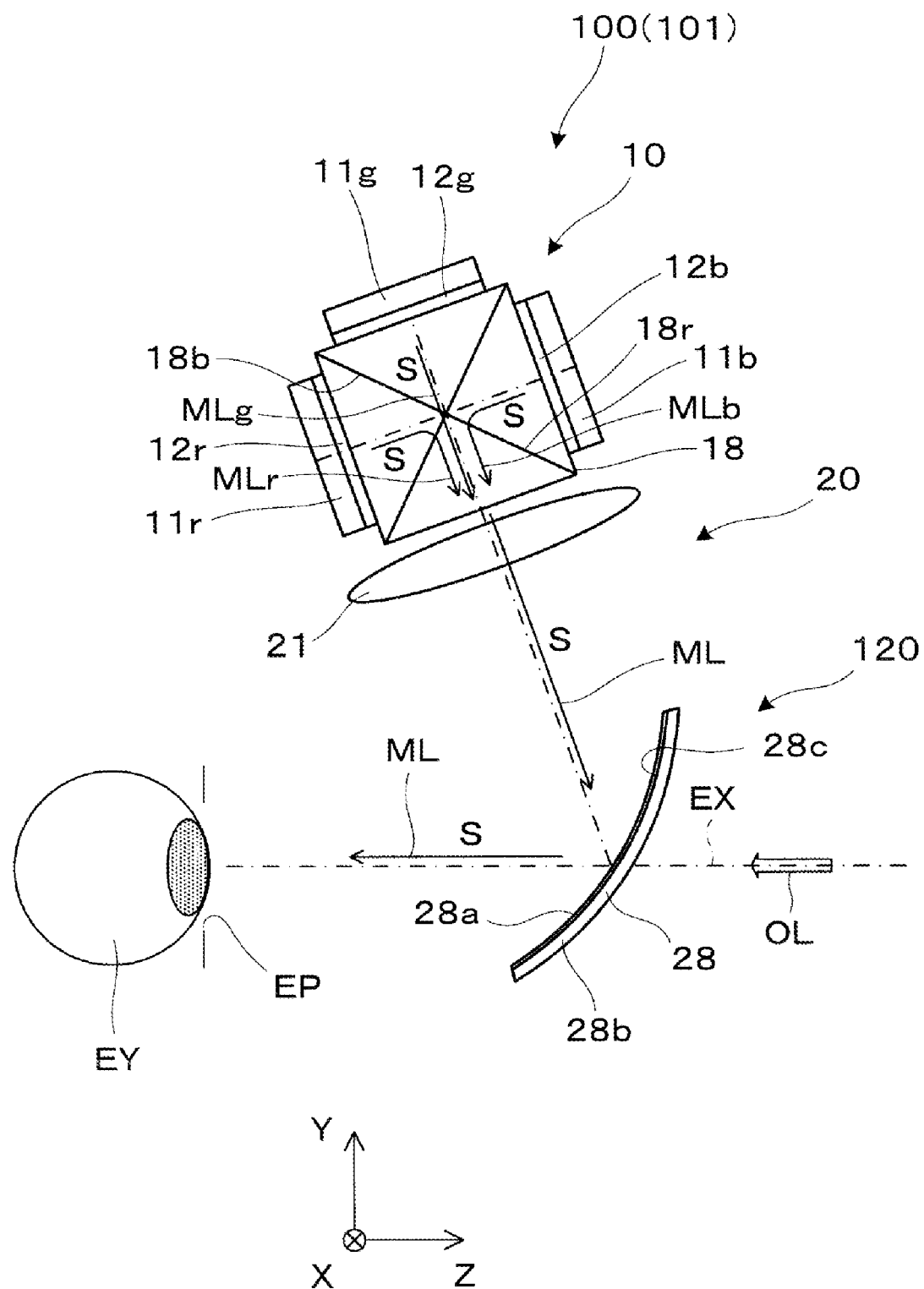
FIG. 17 is a conceptual side cross-sectional view used to explain an optical system within an HMD according to a second embodiment.

As illustrated in FIG. 17, in a display device 100 according to the second embodiment, the image-forming optical system 20 of the optical device 101 includes the projection lens 21 and the polarized-light separation type collimate mirror 28 as the light-guiding optical system 120. The polarized-light separation type collimate mirror 28 functions as a polarizing mirror having optical refractive power. The polarized-light separation type collimate mirror 28 includes a polarized-light reflection film 28a provided at a concave surface 28c located at the inner side of a base member 28b, and collimates, through reflection, the image light ML that is S-polarized light to cause it to enter the pupil position EP while allowing a P-polarized light component of the image light ML of the external light OL to pass through.

The polarized-light separation type collimate mirror 28 is an off-axis optical system. The concave surface 28c is not limited to a curved surface having a symmetric shape such as a spherical surface or an aspherical surface, and may be a free form surface.

Figure 18:
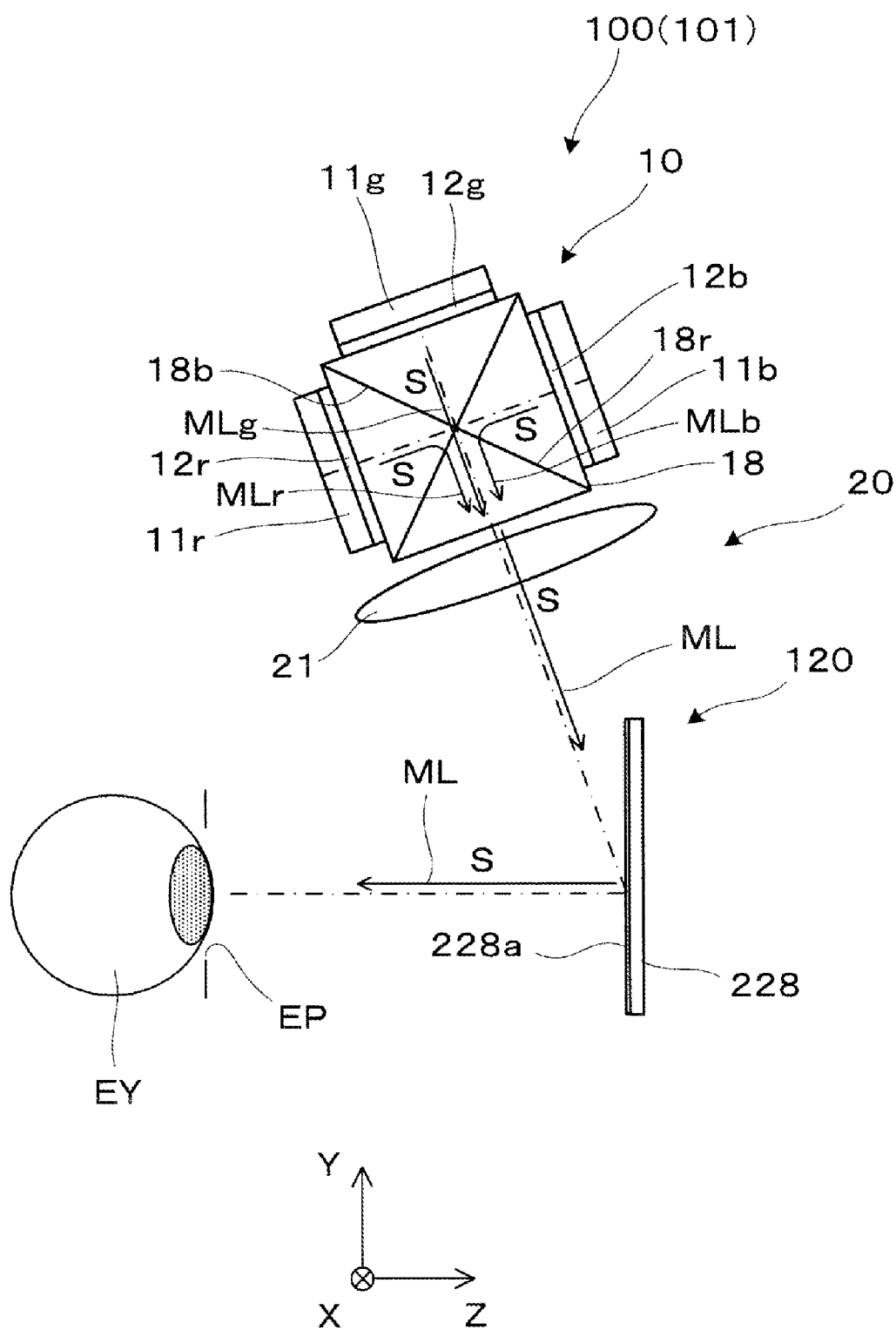
FIG. 18 is a conceptual side cross-sectional view used to explain a modification example.

A modification example of the optical device 101 illustrated in FIG. 17 will be described with reference to FIG. 18. In this case, a flat plate-shaped Fresnel lens is used as a polarized-light separation type collimate mirror 228 that constitutes the light-guiding optical system 120. The polarized-light separation type collimate mirror 228 functions as a polarizing mirror. A Fresnel lens comprised of a large number of lenses having a sawtooth shape in cross section is formed at a polarized-light reflection layer 228a of the polarized-light separation type collimate mirror 228, and a polarized-light reflection film is formed at the front surface thereof. The polarized-light reflection layer 228a has power equivalent to the concave lens. The polarized-light reflection layer 228a of the polarized-light separation type collimate mirror 228 collimates, through reflection, the image light ML that is S-polarized light to cause it to enter the pupil position EP while allowing the P-polarized light component of the image light ML of the external light OL to pass through. Note that the polarized-light reflection layer 228a may be embedded in the base member.

In the present embodiment, no half mirror 27 (see FIG. 2) is used, and hence, efficiency in using light is high. In addition, the image light ML does not leak to the outside of the polarized-light separation type collimate mirror 28, 228, and hence, it is possible to reliably prevent the image light ML from being viewed by a person other than the user US who wears the HMD 200.

Third Embodiment

Below, a display device according to a third embodiment will be described. Note that a head-mounted display device according to the third embodiment is a device obtained by partially modifying the display device according to the first embodiment, and hence, explanation of common portions will not be repeated.

Figure 19:
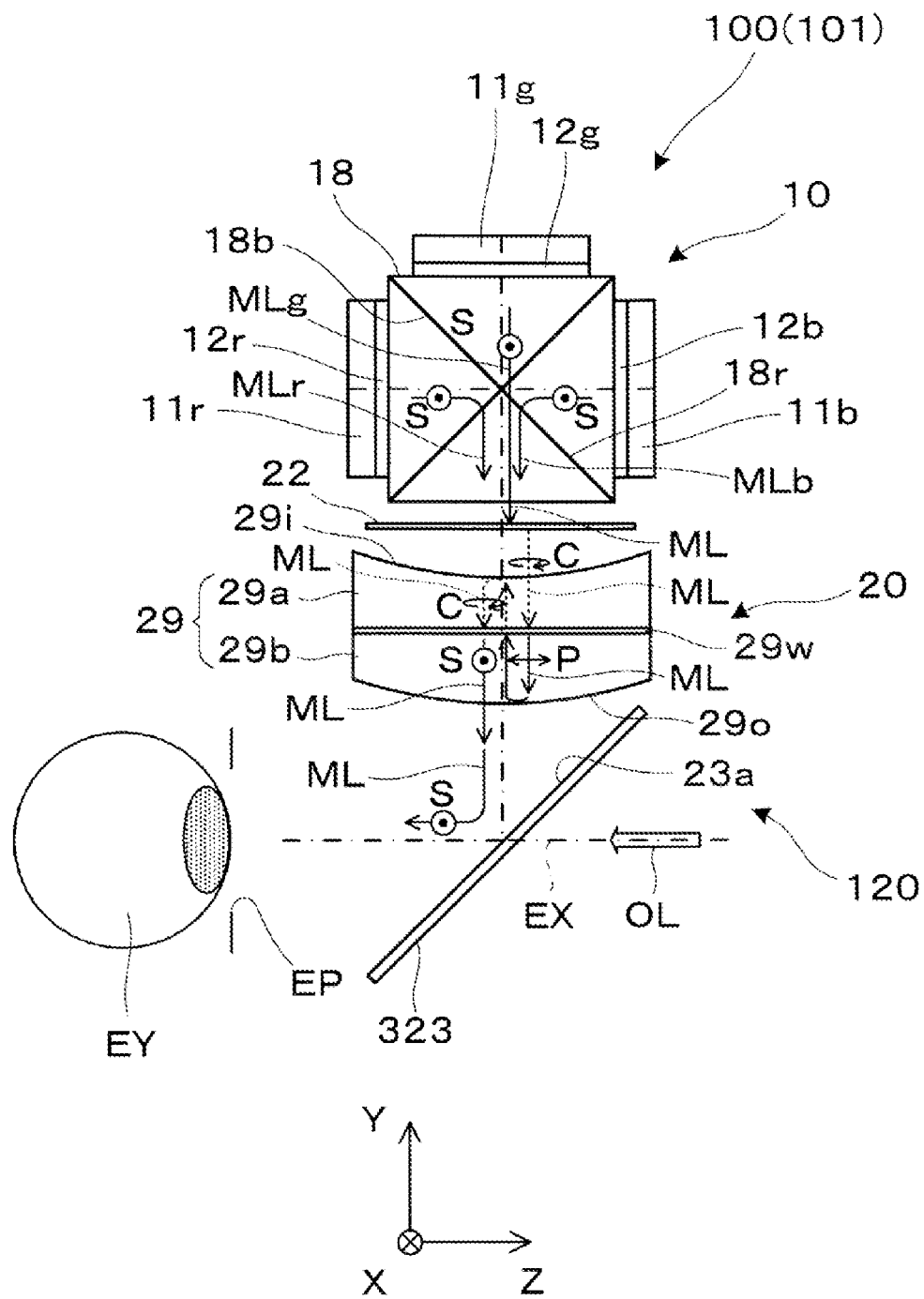
FIG. 19 is a conceptual side cross-sectional view used to explain an optical system within an HMD according to a third embodiment.

As illustrated in FIG. 19, in the display device 100 according to the third embodiment, the image-forming optical system 20 of the optical device 101 includes a first wavelength plate 22, an optical block 29, and a combiner 323. The combiner 323 functions as a polarizing mirror, and constitutes the light-guiding optical system 120.

The first wavelength plate 22 is a λ/4 plate, and is made, for example, of a crystal-based material or resin-based material having birefringence. For the first wavelength plate 22, it is desirable to use a plate that can achieve a phase difference or retardation corresponding to substantially λ/4 concerning each color of RGB. The first wavelength plate 22 is configured to convert the image light ML outputted from the cross dichroic prism 18, from S-polarized light that is polarized light in the first polarization direction into circularly polarized light. The optical block 29 is obtained by integrally joining a lens-shaped first block 29a, a second wavelength plate 29w, and a lens-shaped second block 29b, and includes an incident surface 29i and an output surface 29o. The incident surface 29i includes an optical transparency reflection layer. The output surface 29o includes a polarized-light reflection layer. The second wavelength plate 29w is a λ/4 plate, and it is desirable to use a plate that can achieve a phase difference or retardation corresponding to substantially λ/4 concerning each color of RGB. The optical block 29 as a whole is configured to have a function of collimating the image light ML.

The optical path will be described below. The image light ML exiting from the cross dichroic prism 18 is S-polarized light corresponding to polarized light in the first polarization direction having a polarizing plane parallel to the X direction, and is converted through the first wavelength plate 22 from S-polarized light into circularly polarized light. The image light ML that has passed through the first wavelength plate 22 and turned into circularly polarized light enters the incident surface 29i of the optical block 29, 50% of which passes through it. Then, the light passes through the second wavelength plate 29w to be converted from the circularly polarized light into P-polarized light corresponding to polarized light in the second polarization direction having a polarizing plane parallel to the Z direction. The image light ML that is P-polarized light enters the output surface 29o of the optical block 29 and is reflected toward the incident surface 29i. Then, the light passes through the second wavelength plate 29w again, and is converted from P-polarized light into circularly polarized light. The image light ML that has passed through the second wavelength plate 29w again and is circularly polarized light enters the incident surface 29i, and, for example, 50% (corresponding to 25% of the original image light ML) of the light is reflected. The light passes through the second wavelength plate 29w, and is converted from the circularly polarized light into S-polarized light. The image light ML that has passed through the second wavelength plate 29w and become S-polarized light passes through the output surface 29o, and is outputted from the optical block 29 toward the combiner 323. The image light ML that is S-polarized light and has been reflected at the combiner 323 enters the pupil position EP where the eye EY or pupil of the user US is disposed. The external light OL also enters the combiner 323 along the output optical axis EX, and the combiner 323 causes a P-polarized light component to pass through. In other words, the user US who wears the HMD 200 is able to observe a virtual image made out of the image light ML so as to overlap with the external image.

Note that it may be possible to employ a configuration in which the cross dichroic prism 18 is configured to cause the image light ML that is P-polarized light to exit as in the modification example illustrated in FIG. 7. In this case, the image light ML exiting from the cross dichroic prism 18 passes through the first wavelength plate 22, and is converted from the P-polarized light into circularly polarized light. The image light ML that has passed through the first wavelength plate 22 and become circularly polarized light partially passes through the incident surface 29i of the optical block 29, and then, passes through the second wavelength plate 29w to be converted from the circularly polarized light into S-polarized light. The image light ML that is S-polarized light enters the output surface 29o of the optical block 29 to be reflected toward the incident surface 29i. Then, the light passes through the second wavelength plate 29w again to be converted from the S-polarized light into circularly polarized light. The image light ML that has passed through the second wavelength plate 29w again and become circularly polarized light enters the incident surface 29i to be partially reflected, and passes through the second wavelength plate 29w to be converted from the circularly polarized light into P-polarized light. The image light ML that has passed through the second wavelength plate 29w and become the P-polarized light passes through the output surface 29o, and is outputted from the optical block 29 toward the combiner 323.

Fourth Embodiment

Below, a display device according to a fourth embodiment will be described. Note that a head-mounted display device according to the fourth embodiment is a device obtained by partially modifying the display device according to the first embodiment, and hence, explanation of common portions will not be repeated.

Figure 20:
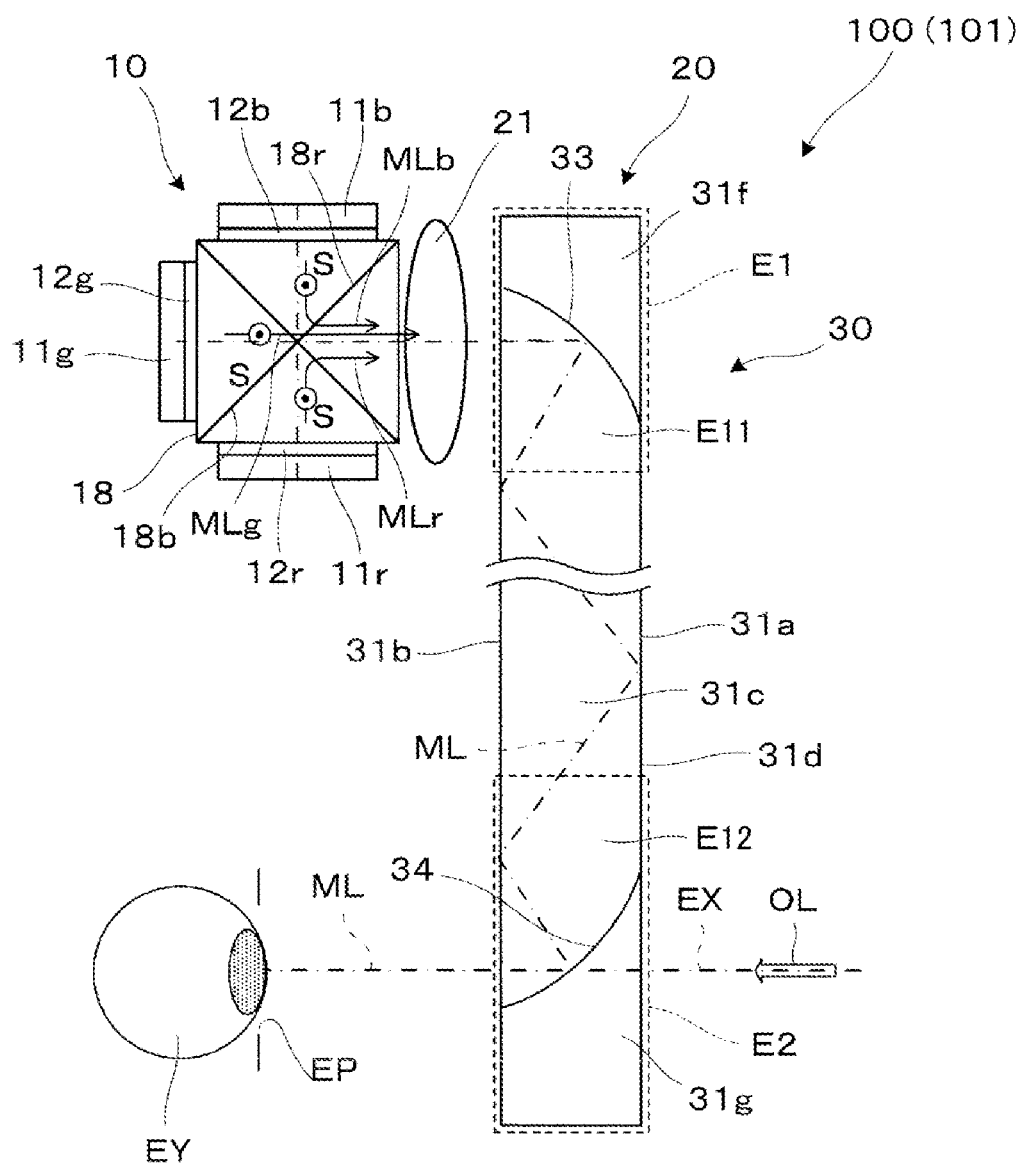
FIG. 20 is a conceptual side cross-sectional view used to explain an optical system within an HMD according to a fourth embodiment.

As illustrated in FIG. 20, in the display device 100 according to the fourth embodiment, the image-forming optical system 20 of the optical device 101 includes the projection lens 21 and a light-guiding optical system 30. The light-guiding optical system 30 is a flat plate-shaped member including an outer flat surface 31a at the external side and an inner flat surface 31b at the pupil position EP side. The outer flat surface 31a and the inner flat surface 31b extend parallel to each other. A main body 31c provided between the outer flat surface 31a and the inner flat surface 31b is a uniform refractive medium having a transparent property in a visible light range. A first concave mirror 33 that is an incidence mirror is embedded in an end portion E1 of the light-guiding optical system 30 at the incidence side that is opposed to the projection lens 21, and a second concave mirror 34 that is a polarizing mirror is embedded in an end portion E2 of the light-guiding optical system 30 at an exit side. The first concave mirror 33 is formed, for example, such that a reflection film is formed at the optical surface formed at a one-side end portion E11 of a light-guiding member 31d that constitutes a main body 31c, and a supplement member 31f having optical transparency is joined to the end portion E11. The second concave mirror 34 is formed, for example, such that a reflection film is formed at the optical surface formed at an other-side end portion E12 of the light-guiding member 31d that constitutes the main body 31c, and a supplement member 31g having optical transparency is joined to the end portion E12.

The image light ML that is S-polarized light and exits from the cross dichroic prism 18: passes through the projection lens 21; enters the inside of the light-guiding member 31d from the inner flat surface 31b at the end portion E11 of the light-guiding member 31d; is reflected at the first concave mirror 33; travels within the main body 31c while being totally reflected between the outer flat surface 31a and the inner flat surface 31b; and enters the second concave mirror 34. When the image light ML travels within the main body 31c, an intermediate image, which is not illustrated, is formed with the image light ML. The second concave mirror 34 serves as a polarizing mirror to reflect the image light ML that is S-polarized light and bring it into a collimated state, and causes it to exit to the outside of the light-guiding optical system 30 through the inner flat surface 31b extending at the end portion E12 of the light-guiding member 31d. The image light ML exiting to the outside of the light-guiding optical system 30 and brought into the collimated state enters the pupil position EP where the eye EY or a pupil of the user US is disposed. The external light OL also enters, along the output optical axis EX, the end portion E2 of the light-guiding member 31d that allows the P-polarized light component to pass through. In other words, the user US who wears the HMD 200 is able to observe a virtual image made out of image light ML so as to overlap with an external image.

In the display device 100 illustrated in FIG. 20, the intersecting axis CX of the cross dichroic prism 18 is parallel to the traverse direction in which the eyes EY of the user US are arranged, that is, to the X direction and extends in the traverse X direction, and the light-guiding optical system 30 extends upwards from the position of the eye EY in the +Y direction. Note that, when the entire optical device 101 is turned around the Z-axis by 90° in the clockwise direction, the light-guiding optical system 30 extends in the −X direction at the right side or the ear side from the position of the eye EY, and the intersecting axis CX of the cross dichroic prism 18 is parallel to the vertical Y direction.

Fifth Embodiment

Below, a display device according to a fifth embodiment will be described. Note that a head-mounted display device according to the fifth embodiment is a device obtained by partially modifying the display device according to the fourth embodiment, and hence, explanation of common portions will not be repeated.

Figure 21:
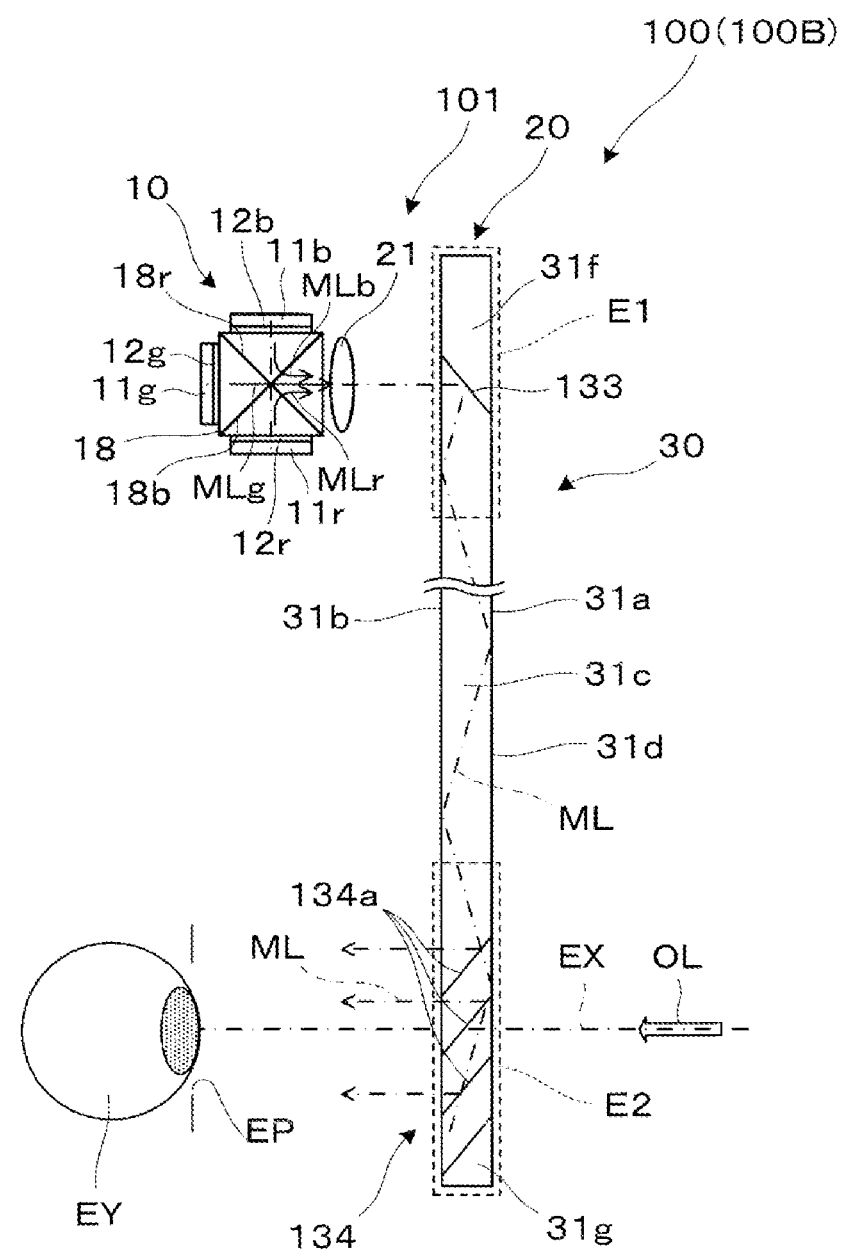
FIG. 21 is a conceptual diagram used to explain an optical system within an HMD according to a fifth embodiment.

As illustrated in FIG. 21, in the display device 100 according to the fifth embodiment, a plane mirror 133 that is an incidence mirror is embedded in the end portion E1 of the light-guiding optical system 30 at the incidence side that is opposed to the projection lens 21, and a half mirror array 134 is embedded in the end portion E2 of the light-guiding optical system 30 at the exit side. The half mirror array 134 is configured such that a large number of half mirrors 134a are arrayed in the light guiding direction. The half mirrors 134a are polarizing mirrors each having reflectance adjusted so as to partially reflect S-polarized light. In this case, the image light ML that is S-polarized light and exits from the cross dichroic prism 18: passes through the projection lens 21 to be collimated; enters the inside of the light-guiding member 31d at the end portion E1 of the light-guiding member 31d; is reflected at the plane mirror 133; travels within the main body 31c; and enters the half mirror array 134. The half mirror array 134 serves as a polarizing mirror, and branches and reflects the image light ML that is S-polarized light to expand the pupil size in the traverse direction. In addition, the half mirror array 134 causes the image light ML that is S-polarized light in a collimated state to exit to the outside of the light-guiding optical system 30. The image light ML exiting to the outside of the light-guiding optical system 30 enters the pupil position EP where the eye EY or pupil of the user US is disposed.

In the display device 100 illustrated in FIG. 21, the intersecting axis CX of the cross dichroic prism 18 is perpendicular to the traverse direction in which the eyes EY of the user US are arranged, that is, to the X direction, and extends in the vertical Y direction. The light-guiding optical system 30 extends in the +X direction at the left side or the ear side from the position of the eye EY. Note that, when the entire optical device 101 is turned around the Z-axis by 90° in the clockwise direction, the light-guiding optical system 30 extends in the vertical +Y direction, and the intersecting axis CX of the cross dichroic prism 18 is parallel to the traverse direction, that is, to the X direction.

Sixth Embodiment

Below, a display device according to a sixth embodiment will be described. Note that a head-mounted display device according to the sixth embodiment is a device obtained by partially modifying the display device according to the fourth embodiment.

Figure 22:
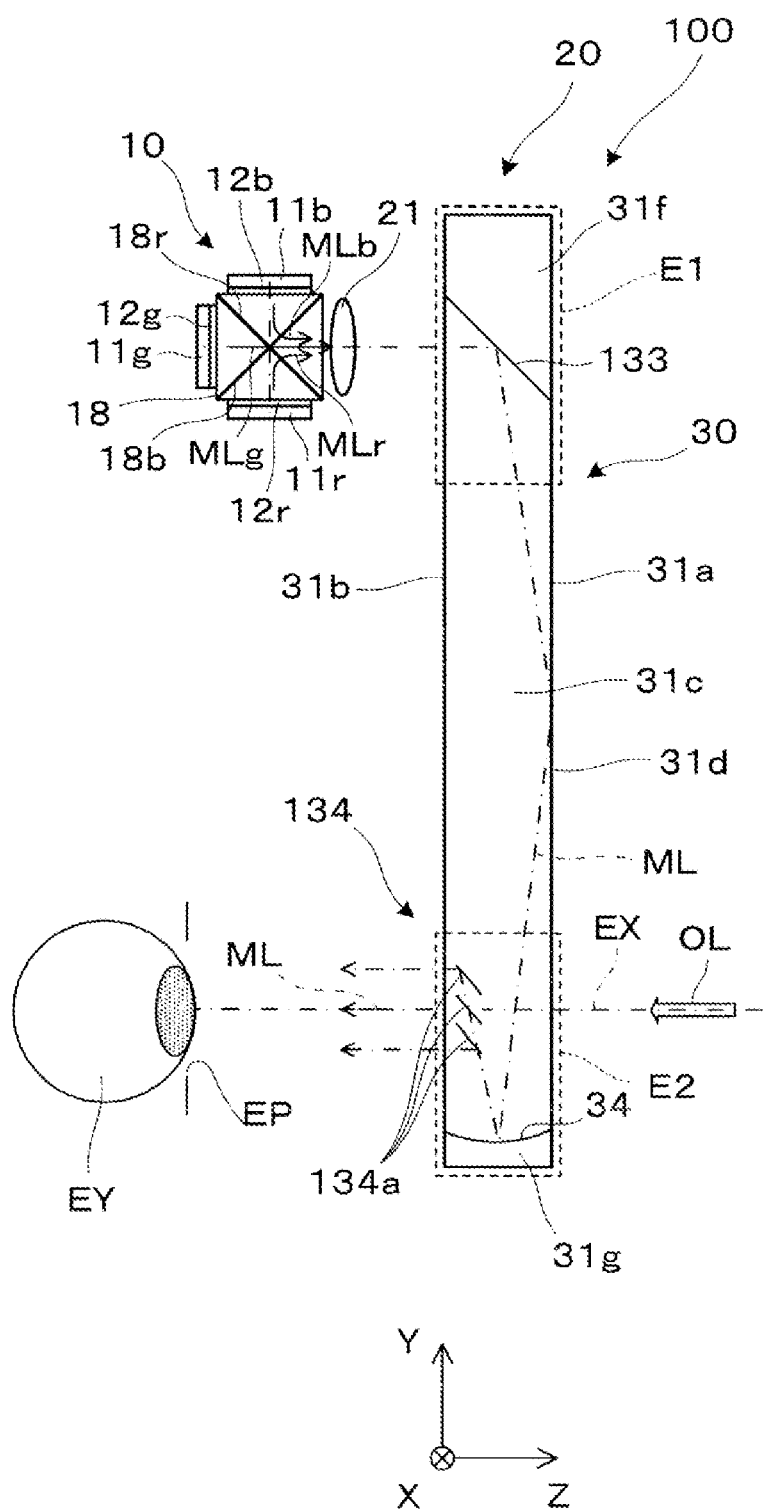
FIG. 22 is a conceptual side cross-sectional view used to explain an optical system within an HMD according to a sixth embodiment.

As illustrated in FIG. 22, in the display device 100 according to the sixth embodiment, the plane mirror 133 is embedded in the end portion E1 of the light-guiding optical system 30 at the incidence side that is opposed to the projection lens 21, and the concave mirror 34 and the half mirror array 134 are embedded in the end portion E2 of the light-guiding optical system 30 at the exit side. At the time of reflecting the image light ML that is S-polarized light reflected at the plane mirror 133 and traveling within the main body 31c, the concave mirror 34 collimates it. The half mirror array 134 is configured such that a large number of half mirrors 134a are arrayed in the light guiding direction. The half mirrors 134a are polarizing mirrors each having reflectance adjusted so as to partially reflect S-polarized light. In this case, the image light ML that is S-polarized light and exits from the cross dichroic prism 18 to enter the projection lens 21: enters the inside of the light-guiding member 31d at the end portion E1 of the light-guiding member 31d; is reflected at the plane mirror 133; travels within the main body 31c; forms an intermediate image; is reflected at the concave mirror 34 to be collimated; and enters the half mirror array 134. The half mirror array 134 branches and reflects the image light ML that is S-polarized light to expand the pupil size in the traverse direction, and causes the light to exit to the outside of the light-guiding optical system 30. The image light ML exiting to the outside of the light-guiding optical system 30 in a collimated state enters the pupil position EP where the eye EY or pupil of the user US is disposed.

In the display device 100 illustrated in FIG. 22, the intersecting axis CX of the cross dichroic prism 18 extends in the horizontal X direction, and the light-guiding optical system 30 extends in the vertical Y direction. However, these directions may be swapped. In addition, the display device 100 has a relatively small angle of view, and collimating can be performed by the concave mirror 34. Thus, the lens 21 of the image-forming optical system 20 may not be provided.

Figure 23:
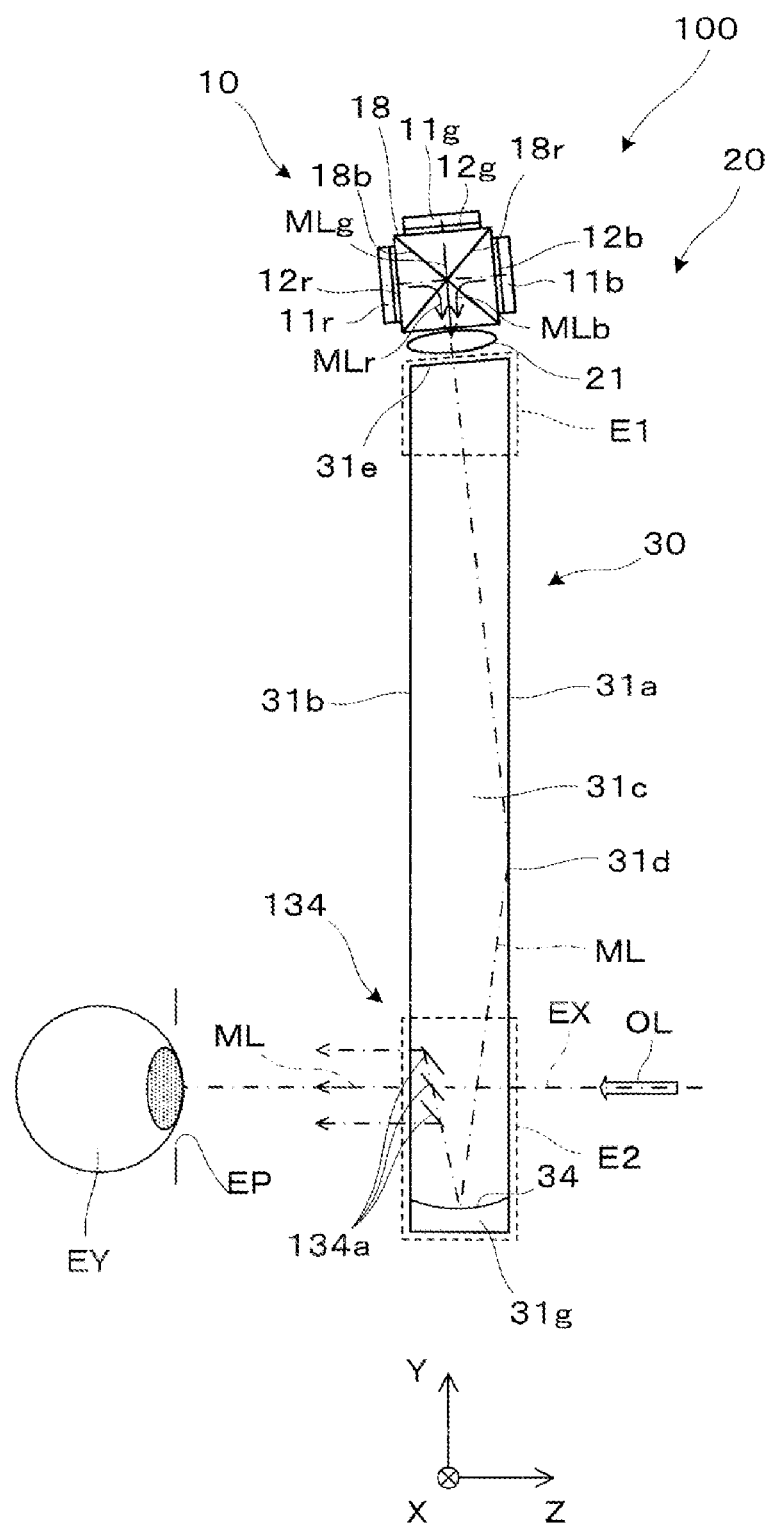
FIG. 23 is a conceptual front view used to explain an optical system of a modification example.

A modification example of the optical device 101 illustrated in FIG. 22 will be described with reference to FIG. 23. In this case, the plane mirror 133 is not provided at the end portion E1 of the light-guiding optical system 30. The image light ML that is S-polarized light and exits from the cross dichroic prism 18 is guided into the light-guiding member 31d from the end surface 31e through the projection lens 21.

Seventh Embodiment

Below, a display device according to a seventh embodiment will be described. Note that a head-mounted display device according to the seventh embodiment is a device obtained by partially modifying the display device according to the fifth embodiment.

Figure 24:
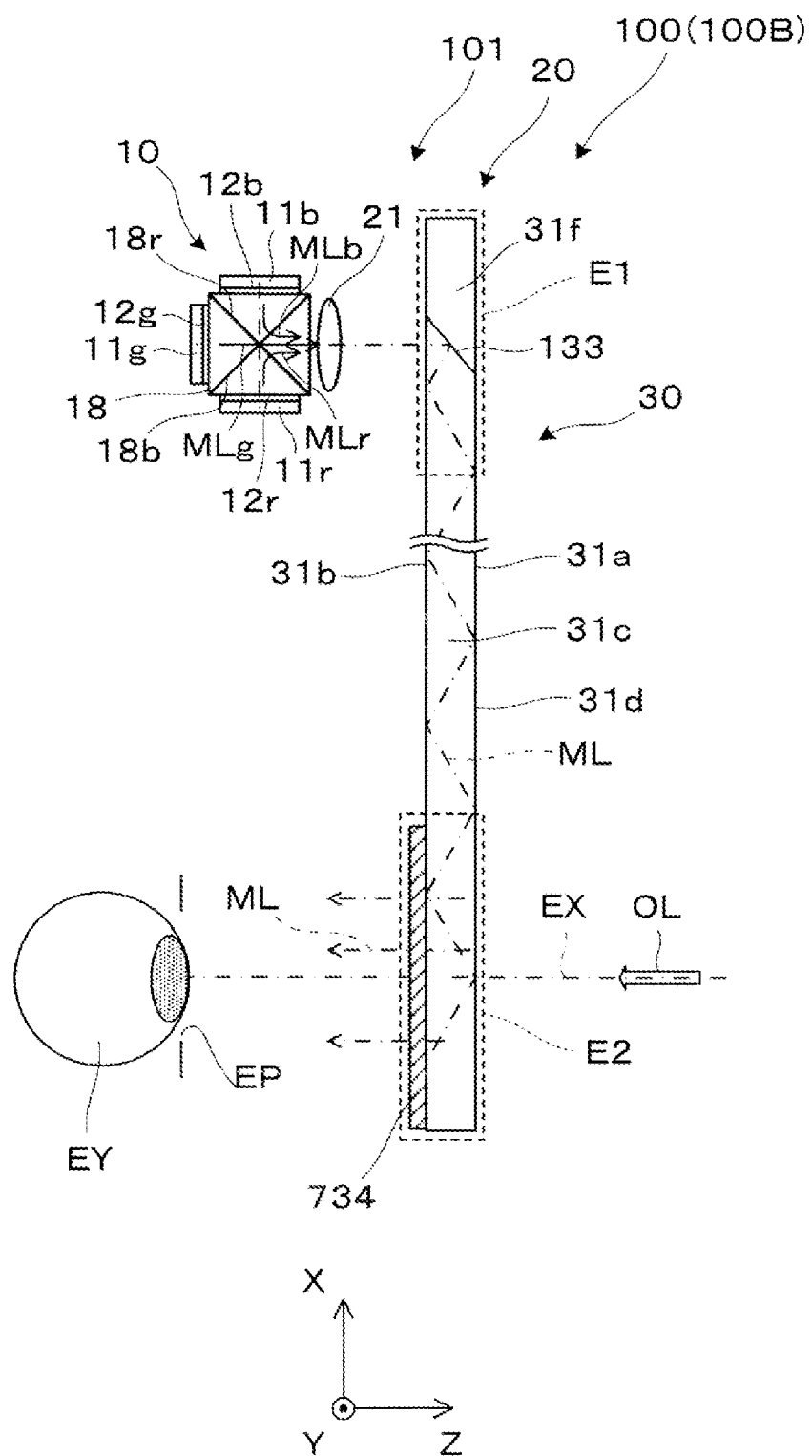
FIG. 24 is a conceptual diagram used to explain an optical system within an HMD according to a seventh embodiment.

As illustrated in FIG. 24, the end portion E2 of the light-guiding optical system 30 at the exit side is configured such that a stack mirror layer 734 that functions in a manner similar to the half mirror array 134 is attached at the inner flat surface 31b of the end portion E2 at the exit side. Note that the lens 21 of the image-forming optical system 20 may not be provided.

Modification Examples and Others

The present disclosure is described with respect to the embodiments described above. However, the present disclosure is not limited to the embodiments described above. The present disclosure may be carried out in various modes without departing from the gist of the present disclosure, and, for example, the following modifications may be possible.

The self-light-emitting panels 11r, 11b, and 11g are not limited to an organic EL display. It is possible to replace it with a display using an inorganic EL, LED array, a quantum dot light-emitting diode (QLED), or the like.

It may be possible to arrange the self-light-emitting panel 11r, 11b, 11g and the polarizing filter 12r, 12b, 12g so as to be spaced apart from each other, rather than being in close contact with each other. In addition, it may be possible to employ a configuration in which, rather than being in close contact with each other, the polarizing filter 12r, 12b, 12g and the incident surface 18ia, 18ib, 18ic of the cross dichroic prism 18 are arranged so as to be spaced apart from each other at distances varying from color to color.

The sizes of four right triangle prisms 18a that constitute the cross dichroic prism 18 may differ from each other. In this case, the distance from the intersecting axis CX of the cross dichroic prism 18 to the incident surface 18ia, 18ib, 18ic differs from each other.

The configuration of the light-guiding optical system 120, 30 is not limited to the configuration indicated as examples, and may be changed into various non-diffractive type optical systems including a refracting surface or reflective surface.

Although it has been described above that the display device 100 or the like can be used as an HMD, the present disclosure is not limited to this, and the disclosure according to the present application can be applied to various optical devices, such as a head-up display (HUD).

A display device according to a specific aspect includes: a first self-light-emitting panel; a second self-light-emitting panel of which wavelength of emitted light differs from that of the first self-light-emitting panel; a cross dichroic prism configured to cause first image light and second image light to exit as combined light from an exit surface, the first image light exiting from the first self-light-emitting panel and entering from a first incident surface, the second image light exiting from the second self-light-emitting panel and entering from a second incident surface; a first polarizing plate provided between the first self-light-emitting panel and the first incident surface; a second polarizing plate provided between the second self-light-emitting panel and a second incident surface; and a light-guiding optical system including a polarizing mirror and configured to deflect the combined light from the cross dichroic prism using the polarizing mirror, in which polarizing axes of the first polarizing plate and the second polarizing plate and a polarizing axis of the polarizing mirror are perpendicular to or parallel to an intersecting axis of the cross dichroic prism.

In the display device, the polarizing axes of the first polarizing plate and the second polarizing plate and the polarizing axis of the polarizing mirror are perpendicular to or parallel to the intersecting axis of the cross dichroic prism. Thus, it is possible to cause the image light deflected in a unified manner to enter the dichroic mirror of the cross dichroic prism. In addition, it is possible to suppress a reduction in brightness of the image light, and it is possible to achieve observation of a bright image. Note that, when the image light is polarized light, it is possible to easily configure the optical system used to observe the external light while reducing light leaking to the outside.

In a specific aspect, the polarizing axis of the polarizing mirror is parallel to the intersecting axis of the cross dichroic prism. In this case, it is possible to easily increase the reflectance of the combined light or image light with the polarizing mirror.

In a specific aspect, the intersecting axis of the cross dichroic prism is parallel to the traverse direction in which eyes of a user are arranged.

In a specific aspect, the cross dichroic prism includes two dichroic mirrors each disposed forming an angle of 45° relative to the first incident surface.

A specific aspect includes a third self-light-emitting panel of which wavelength of emitted light differs from those of the first self-light-emitting panel and the second self-light-emitting panel, and a third polarizing plate provided between the first self-light-emitting panel and the third incident surface provided at the cross dichroic prism, in which the cross dichroic prism causes the third image light entering from the third incident surface to pass through the cross dichroic prism and exit as combined light. In this case, it is possible to display a bright color image using three self-light-emitting panels.

In a specific aspect, the intersecting axis of the cross dichroic prism is perpendicular to the traverse direction in which eyes of a user are arranged.

In a specific aspect, the polarizing mirror includes a flat surface, or a curved surface having optical refractive power. When the polarizing mirror includes a flat surface, it is possible to fold the simple optical path in terms of image light. When the polarizing mirror includes a curved surface having optical refractive power, it is possible to make the polarizing mirror have a function of making the image light converge at the time of bending or folding the optical path.

In a specific aspect, the polarizing mirror includes a flat surface, and the display device includes a half mirror including a concave surface configured to partially reflect combined light reflected by the polarizing mirror, and a wavelength plate disposed between the polarizing mirror and the half mirror. In this case, it is possible to collimate the combined light or image light while suppressing a loss at the polarizing mirror and the half mirror, and it is also possible to observe the external light over the half mirror.

A specific aspect includes a lens disposed between the cross dichroic prism and the polarizing mirror. In this case, it is possible to cause the combined light or image light exiting from the cross dichroic prism to be collimated or converge.

A specific aspect includes a light-guiding optical system including a parallel flat-plate light-guiding member and also including an incidence mirror provided at one end of the light-guiding member and configured to couple the combined light from the cross dichroic prism to the light-guiding member, in which the polarizing mirror is provided at another end of the light-guiding member. In this case, it is possible to use the light-guiding member to adjust the arrangement of the cross dichroic prism relative to the other end of the light-guiding member, which makes it possible to enhance the degree of freedom of the shape of the display device.

A display device according to a specific aspect includes: a first self-light-emitting panel; a second self-light-emitting panel of which wavelength of emitted light differs from that of the first self-light-emitting panel; a dichroic prism configured to cause first image light and second image light to exit as combined light from an exit surface, the first image light exiting from the first self-light-emitting panel and entering from a first incident surface, the second image light exiting from the second self-light-emitting panel and entering from a second incident surface; a first polarizing plate provided between the first self-light-emitting panel and the first incident surface; a second polarizing plate provided between the second self-light-emitting panel and the second incident surface; and a light-guiding optical system including a polarizing mirror and configured to deflect the combined light from the dichroic prism using the polarizing mirror, in which, when a first direction is a direction toward an other-side end from a one-side end located at a side of the first self-light-emitting panel with respect to the dichroic mirror of the dichroic prism, polarizing axes of the first polarizing plate and the second polarizing plate and a polarizing axis of the polarizing mirror are perpendicular to the first direction, and are parallel to or perpendicular to a second direction parallel to the dichroic mirror.

With the display device described above, when a first direction is a direction toward an other-side end from a one-side end located at a side of the first self-light-emitting panel with respect to the dichroic mirror of the dichroic prism, the polarizing axes of the first polarizing plate and the second polarizing plate and the polarizing axis of the polarizing mirror are perpendicular to the first direction, and are parallel to or perpendicular to a second direction parallel to the dichroic mirror. Thus, it is possible to cause the image light deflected in a unified manner to enter the dichroic mirror. In addition, it is possible to suppress a reduction in brightness of the image light, and it is possible to achieve observation of a bright image.

In a specific aspect, the first self-light-emitting panel causes the first image light and third image light to exit at two wavelengths of emitted light differing from each other and differing from the wavelength of emitted light of the second self-light-emitting panel.

A composite display device according to a specific aspect includes the first display device described above and the second display device described above, in which the intersecting axis of the cross dichroic prism included in the first display device and the intersecting axis of the cross dichroic prism included in the second display device are parallel to each other.

What is claimed is:

1. A display device comprising:
   a first self-light-emitting panel;
   a second self-light-emitting panel of which wavelength of emitted light differs from that of the first self-light-emitting panel;
   a cross dichroic prism configured to cause first image light and second image light to exit as combined light from an exit surface, the first image light exiting from the first self-light-emitting panel and entering from a first incident surface, the second image light exiting from the second self-light-emitting panel and entering from a second incident surface;
   a first polarizing plate provided between the first self-light-emitting panel and the first incident surface;
   a second polarizing plate provided between the second self-light-emitting panel and the second incident surface; and
   a light-guiding optical system including a polarizing mirror and configured to deflect the combined light from the cross dichroic prism using the polarizing mirror, wherein
   polarizing axes of the first polarizing plate and the second polarizing plate and a polarizing axis of the polarizing mirror are perpendicular to or parallel to an intersecting axis of the cross dichroic prism,
   the polarizing mirror includes a flat surface, and
   the display device includes:
      a half mirror including a concave surface configured to partially reflect the combined light reflected by the polarizing mirror and
      a wavelength plate disposed between the polarizing mirror and the half mirror.

2. The display device according to claim 1, wherein the polarizing axis of the polarizing mirror is parallel to the intersecting axis of the cross dichroic prism.

3. The display device according to claim 1, wherein the intersecting axis of the cross dichroic prism is parallel to a traverse direction in which eyes of a user are arranged.

4. The display device according to claim 3, wherein the cross dichroic prism includes two dichroic mirrors each disposed forming an angle of 45° relative to the first incident surface.

5. The display device according to claim 4, further comprising:
   a third self-light-emitting panel of which wavelength of emitted light differs from those of the first self-light-emitting panel and the second self-light-emitting panel; and
   a third polarizing plate provided between the third self-light-emitting panel and a third incident surface provided at the cross dichroic prism, wherein
   the cross dichroic prism causes third image light entering from the third incident surface to pass through the cross dichroic prism and exit as the combined light.

6. The display device according to claim 1, wherein the intersecting axis of the cross dichroic prism is perpendicular to a traverse direction in which eyes of a user are arranged.

7. The display device according to claim 1, further comprising
   a lens disposed between the cross dichroic prism and the polarizing mirror.

8. The display device according to claim 1, further comprising
   a light-guiding optical system including:
      a parallel flat-plate light-guiding member and
      an incidence mirror provided at one end of the light-guiding member and configured to couple the combined light from the cross dichroic prism to the light-guiding member, wherein
   the polarizing mirror is provided at another end of the light-guiding member.

9. A display device comprising:
   a first self-light-emitting panel;
   a second self-light-emitting panel of which wavelength of emitted light differs from that of the first self-light-emitting panel;
   a dichroic prism configured to cause first image light and second image light to exit as combined light from an exit surface, the first image light exiting from the first self-light-emitting panel and entering from a first incident surface, the second image light exiting from the second self-light-emitting panel and entering from a second incident surface;
   a first polarizing plate provided between the first self-light-emitting panel and the first incident surface;
   a second polarizing plate provided between the second self-light-emitting panel and the second incident surface; and
   a light-guiding optical system including a polarizing mirror and configured to deflect the combined light from the dichroic prism using the polarizing mirror, wherein
   when a first direction is a direction toward an other-side end from a one-side end located at a side of the first self-light-emitting panel with respect to a dichroic mirror of the dichroic prism, polarizing axes of the first polarizing plate and the second polarizing plate and a polarizing axis of the polarizing mirror are perpendicular to the first direction, and are parallel to or perpendicular to a second direction parallel to the dichroic mirror,
   the polarizing mirror includes a flat surface, and
   the display device includes:
      a half mirror including a concave surface configured to partially reflect the combined light reflected by the polarizing mirror and
      a wavelength plate disposed between the polarizing mirror and the half mirror.

10. The display device according to claim 9, wherein the first self-light-emitting panel causes the first image light and a third image light to exit at two wavelengths of emitted light differing from each other and differing from the wavelength of emitted light of the second self-light-emitting panel.

11. A composite display device comprising:
    a first display device according to claim 1; and
    a second display device according to claim 1, wherein
    the intersecting axis of the cross dichroic prism included in the first display device and the intersecting axis of the cross dichroic prism included in the second display device are parallel to each other.

12. A display device comprising:
a first self-light-emitting panel;
a second self-light-emitting panel of which wavelength of emitted light differs from that of the first self-light-emitting panel;
a cross dichroic prism configured to cause first image light and second image light to exit as combined light from an exit surface, the first image light exiting from the first self-light-emitting panel and entering from a first incident surface, the second image light exiting from the second self-light-emitting panel and entering from a second incident surface;
a first polarizing plate provided between the first self-light-emitting panel and the first incident surface;
a second polarizing plate provided between the second self-light-emitting panel and the second incident surface;
a light-guiding optical system including a polarizing mirror and configured to deflect the combined light from the cross dichroic prism using the polarizing mirror; and
a light-guiding optical system including:
a parallel flat-plate light-guiding member and
an incidence mirror provided at one end of the light-guiding member and configured to couple the combined light from the cross dichroic prism to the light-guiding member, wherein
polarizing axes of the first polarizing plate and the second polarizing plate and a polarizing axis of the polarizing mirror are perpendicular to or parallel to an intersecting axis of the cross dichroic prism,
the polarizing mirror includes a flat surface, or a curved surface having optical refractive power, and
the polarizing mirror is provided at another end of the light-guiding member.

13. The display device according to claim 1, wherein each of the first self-light-emitting panel and second self-light-emitting panel includes a substrate, a light-emitting element layer, a filter, a glue layer, and a transparent cover substrate.

14. The display device according to claim 9, wherein each of the first self-light-emitting panel and second self-light-emitting panel includes a substrate, a light-emitting element layer, a filter, a glue layer, and a transparent cover substrate.

* * * * *